(12) United States Patent
Tsui

(10) Patent No.: US 10,464,711 B2
(45) Date of Patent: Nov. 5, 2019

(54) COLLAPSIBLE HEATABLE LIQUID CONTAINERS

(71) Applicant: Sam Tung Tsui, Kowloon (HK)

(72) Inventor: Sam Tung Tsui, Kowloon (HK)

( * ) Notice: Subject to any disclaimer, the term of this patent is extended or adjusted under 35 U.S.C. 154(b) by 273 days.

(21) Appl. No.: 14/843,102

(22) Filed: Sep. 2, 2015

(65) Prior Publication Data

US 2016/0347503 A1 Dec. 1, 2016

(30) Foreign Application Priority Data

May 29, 2015 (DE) .................... 20 2015 102 788 U

(51) Int. Cl.
*B65D 21/08* (2006.01)
*A47J 27/21* (2006.01)
*B65D 1/02* (2006.01)

(52) U.S. Cl.
CPC ............ *B65D 21/086* (2013.01); *A47J 27/21* (2013.01); *A47J 27/21008* (2013.01); *A47J 27/21191* (2013.01); *B65D 1/0292* (2013.01)

(58) Field of Classification Search
CPC ....... B65D 21/086; B65D 1/0292; A45F 3/20; A45F 2003/205
USPC .................................................... 220/9.1, 666
See application file for complete search history.

(56) References Cited

U.S. PATENT DOCUMENTS

| 1,202,582 | A | * | 10/1916 | Poling .................. B65D 21/086 220/4.04 |
| 4,492,313 | A | | 1/1985 | Touzani |
| RE32,379 | E | | 3/1987 | Touzani |
| 5,310,068 | A | | 5/1994 | Saghri |
| 5,384,138 | A | * | 1/1995 | Robbins, III ........... B29C 53/08 215/10 |
| 5,584,412 | A | * | 12/1996 | Wang ........................ B60R 7/02 220/500 |
| 5,900,293 | A | | 5/1999 | Zettle |
| 6,354,456 | B2 | | 3/2002 | Rapson |

(Continued)

FOREIGN PATENT DOCUMENTS

| CN | 204527899 U | 8/2015 |
| CN | 206880538 U | 1/2018 |
| CN | 207477319 U | 6/2018 |

OTHER PUBLICATIONS

Normann Copenhagen, Strainer blue, Funnel & Strainer, 6 pages, visited Dec. 19, 2013, available at <http://www.normann-copenhagen.com/products/strainer>.

*Primary Examiner* — Shawn M Braden
(74) *Attorney, Agent, or Firm* — Hinshaw & Culbertson LLP

(57) ABSTRACT

Collapsible heatable liquid containers having three non-inverting tiers and two inverting tiers interposed between the non-inverting tiers. The non-inverting tiers are typically formed of a stiff (i.e., stiff or rigid) material that is different from the material of the inverting tiers, which is typically a resilient polymer such as a thermoplastic elastomer or silicone. The bottom non-inverting tier is typically formed of a material suitable for inductive, contact, and flame heating, such as stainless steel. The container may be a liquid vessel suitable for drinking, beverage heating and serving, or cooking, such as a drinking bottle or kettle. A bottle may include an attached cap that engages the top tier to close the bottle, and a kettle may include a pour spout connected to the middle or top tier.

25 Claims, 35 Drawing Sheets

(56) References Cited

U.S. PATENT DOCUMENTS

| | | | |
|---|---|---|---|
| 6,662,964 B2* | 12/2003 | Higuchi | B65D 1/0292 |
| | | | 215/11.3 |
| 6,705,471 B2 | 3/2004 | Kataoka | |
| 7,654,402 B2 | 2/2010 | Kusuma et al. | |
| 7,678,271 B2 | 3/2010 | Curtin | |
| D656,800 S | 4/2012 | Lee et al. | |
| D777,520 S | 1/2017 | Singlaub | |
| D779,886 S | 2/2017 | Singlaub | |
| 9,926,105 B2* | 3/2018 | Tsui | B65D 21/086 |
| 9,969,521 B2 | 5/2018 | Shen | |
| 2009/0057321 A1* | 3/2009 | Hong | B65D 1/0292 |
| | | | 220/666 |
| 2010/0072166 A1 | 3/2010 | Dickie | |
| 2011/0036806 A1 | 2/2011 | Gregg et al. | |
| 2012/0152885 A1* | 6/2012 | Munoz | B65D 1/0292 |
| | | | 215/382 |
| 2012/0205371 A1 | 8/2012 | Lee | |
| 2013/0032592 A1 | 2/2013 | Lee | |
| 2013/0075393 A1 | 3/2013 | Haynie | |
| 2015/0053700 A1* | 2/2015 | Pierson | A45F 3/20 |
| | | | 220/666 |
| 2015/0251795 A1* | 9/2015 | Tsui | A45C 7/0031 |
| | | | 215/306 |

\* cited by examiner

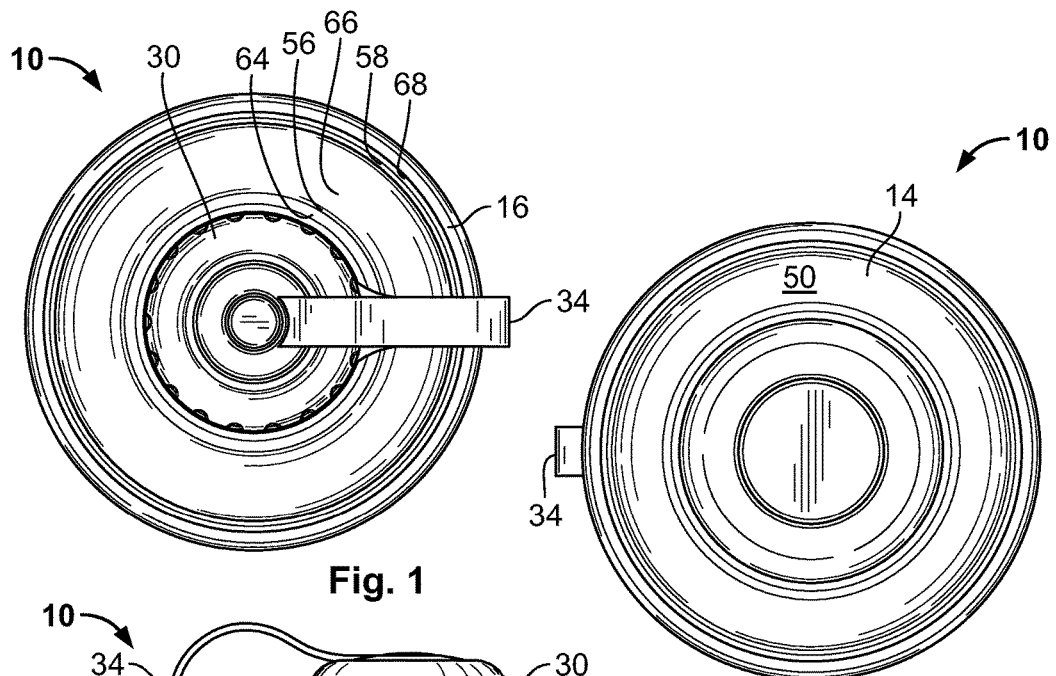
Fig. 1
Fig. 2
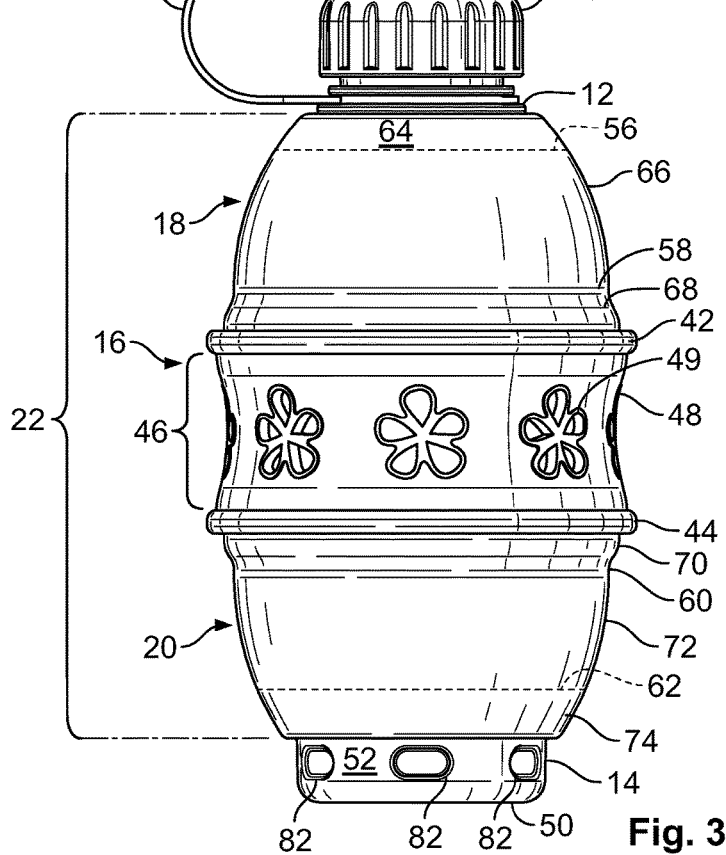
Fig. 3

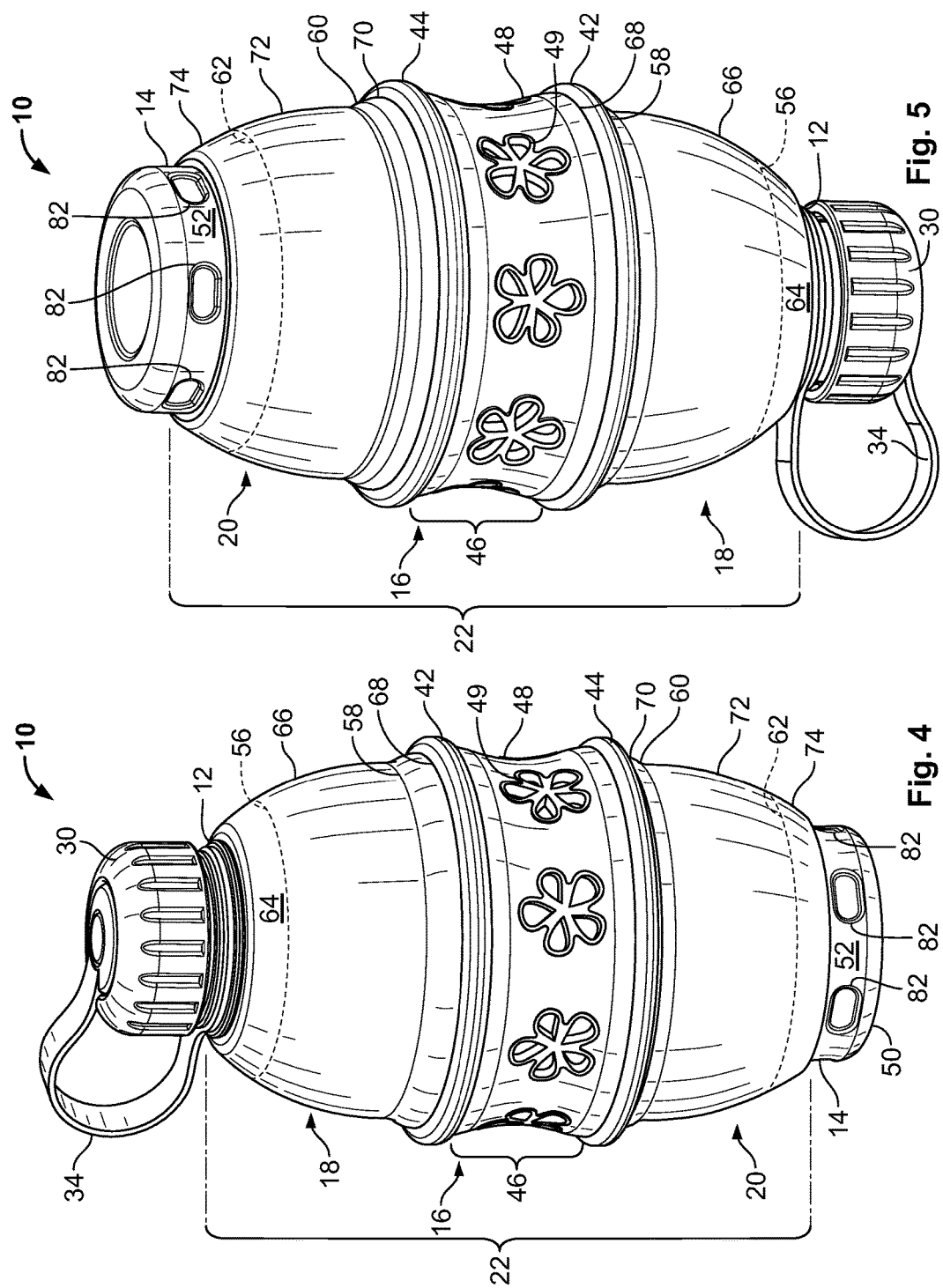

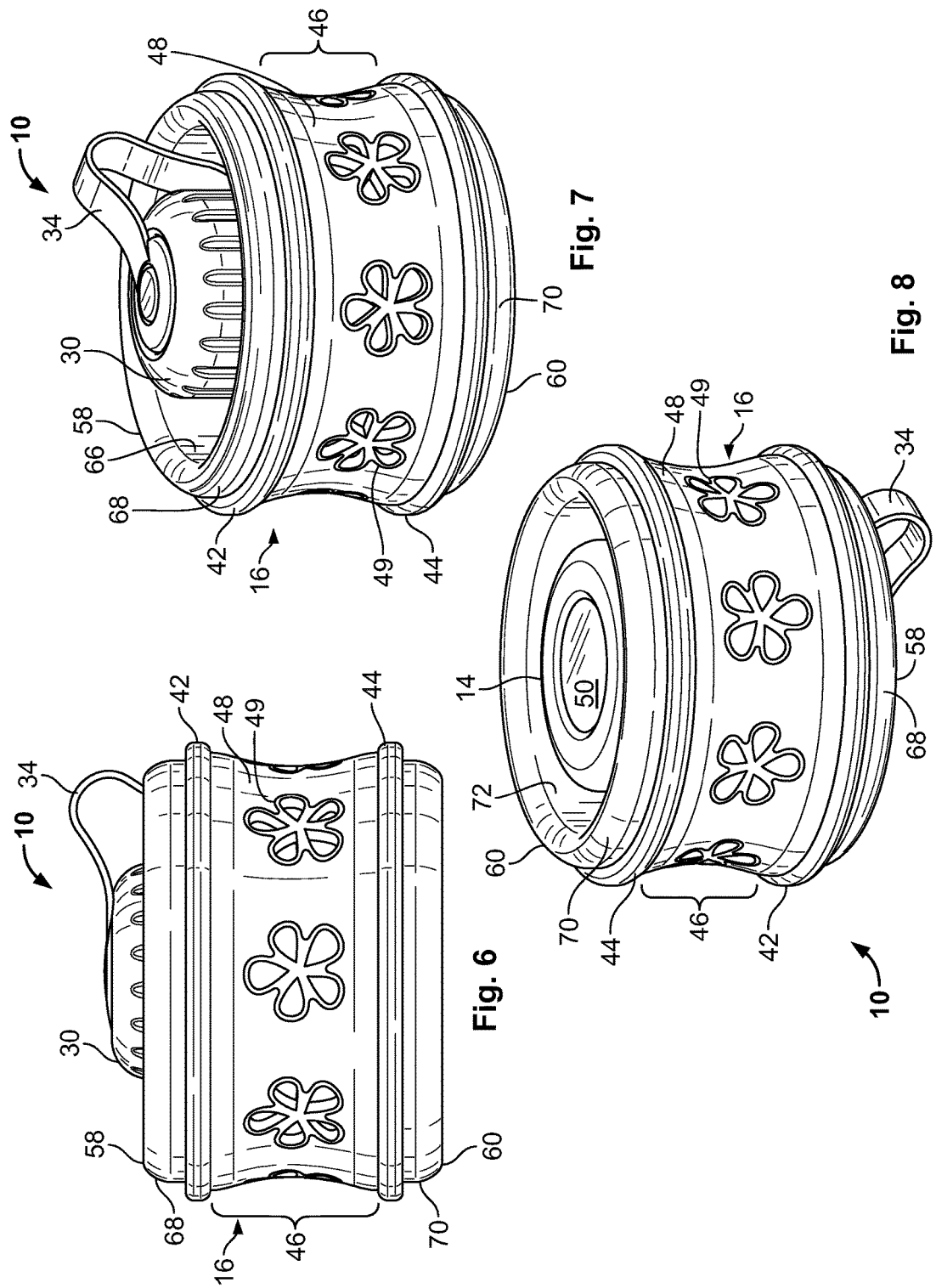

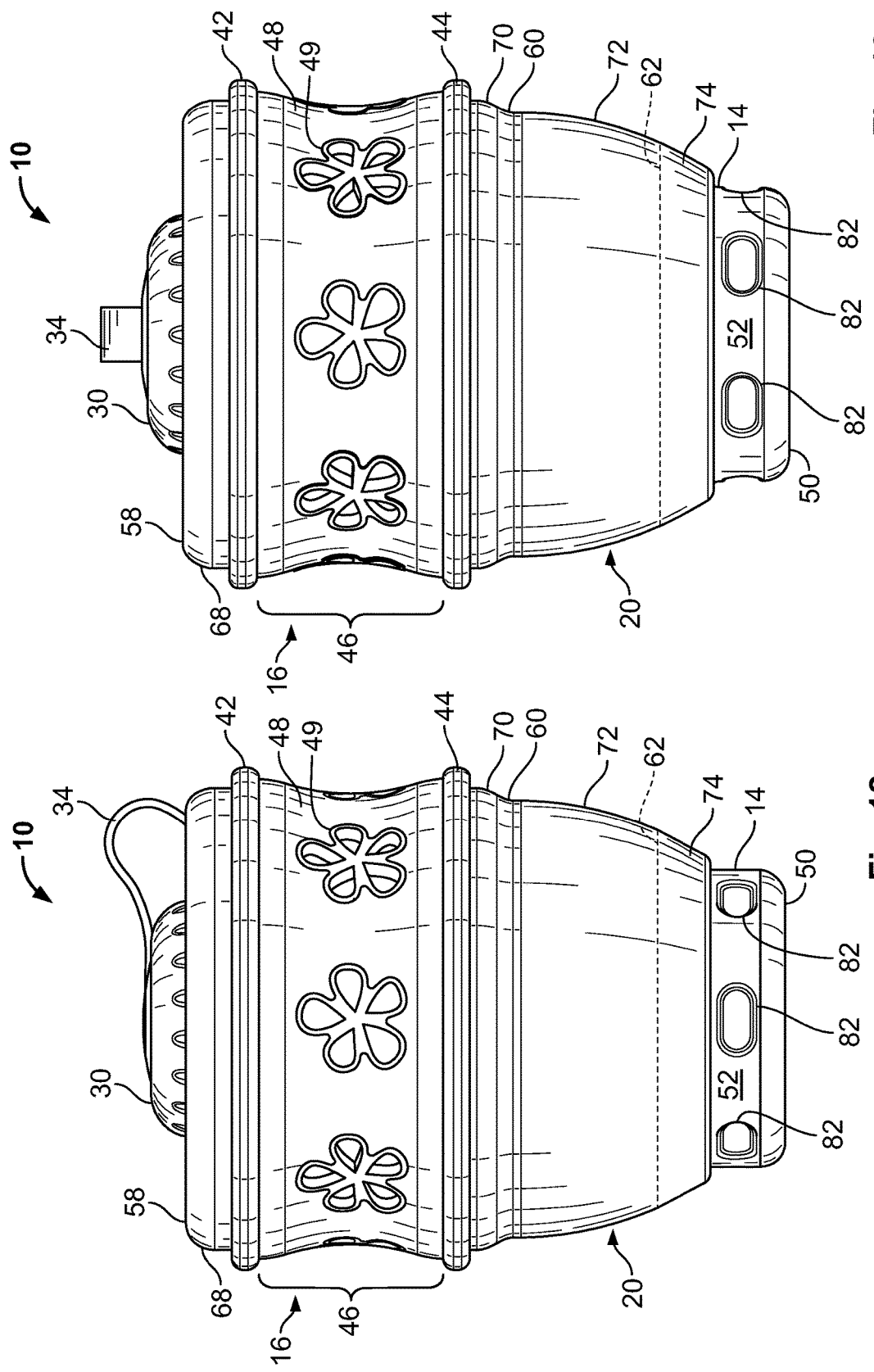

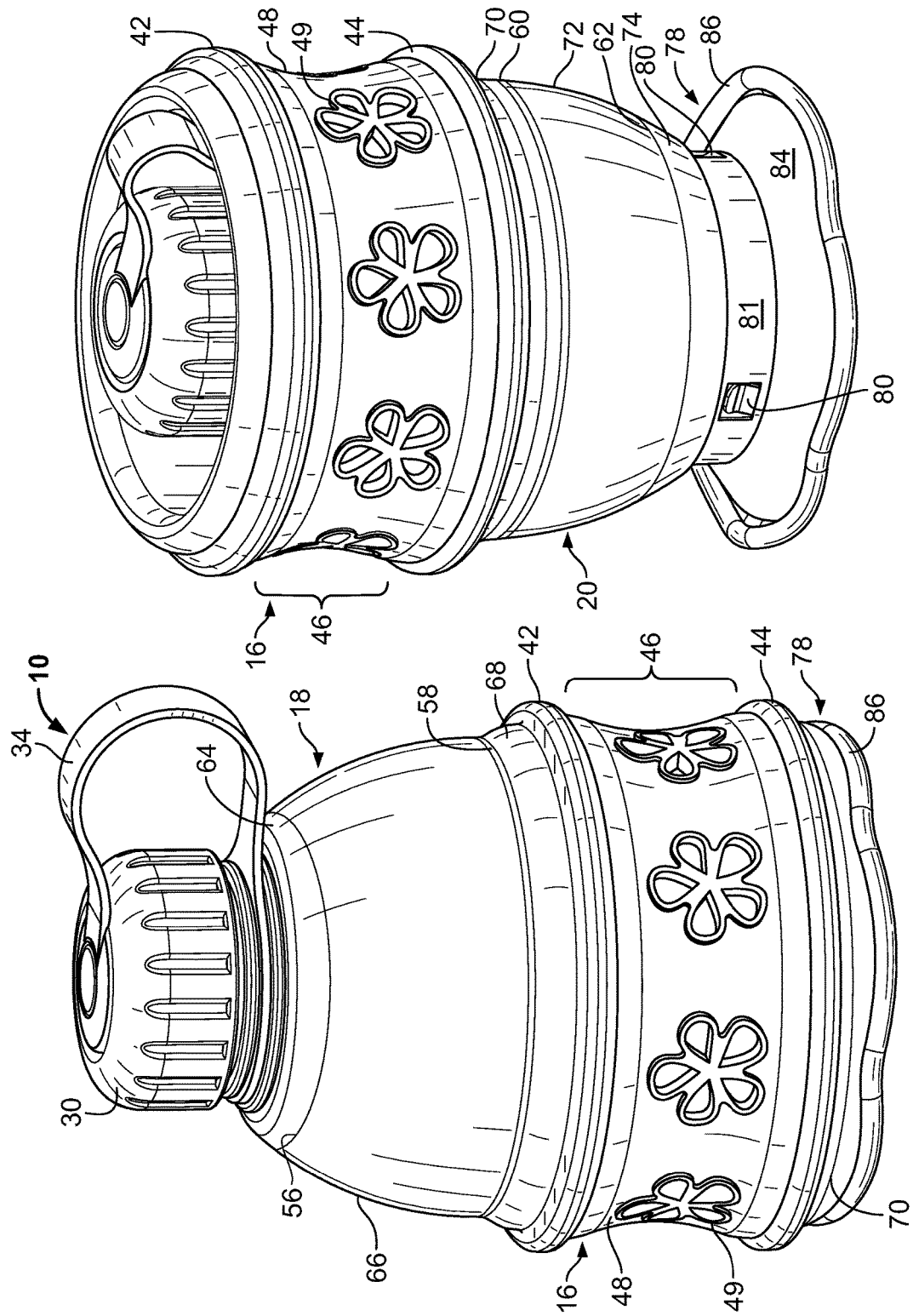

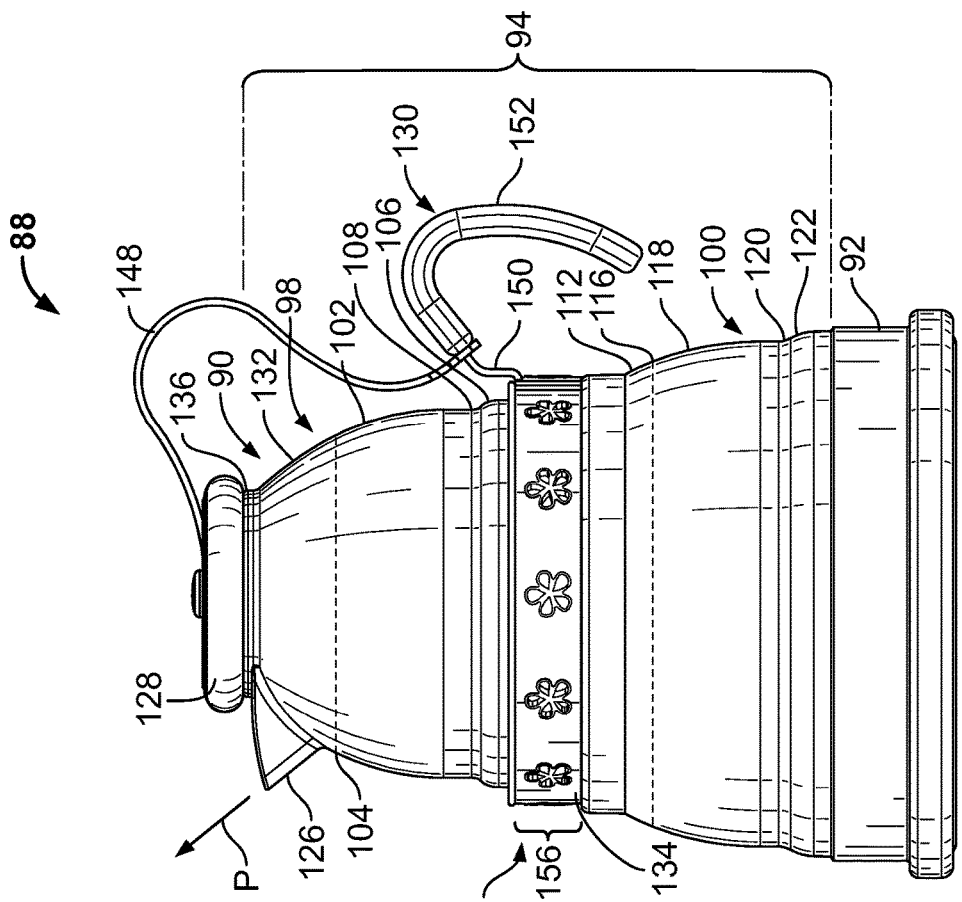
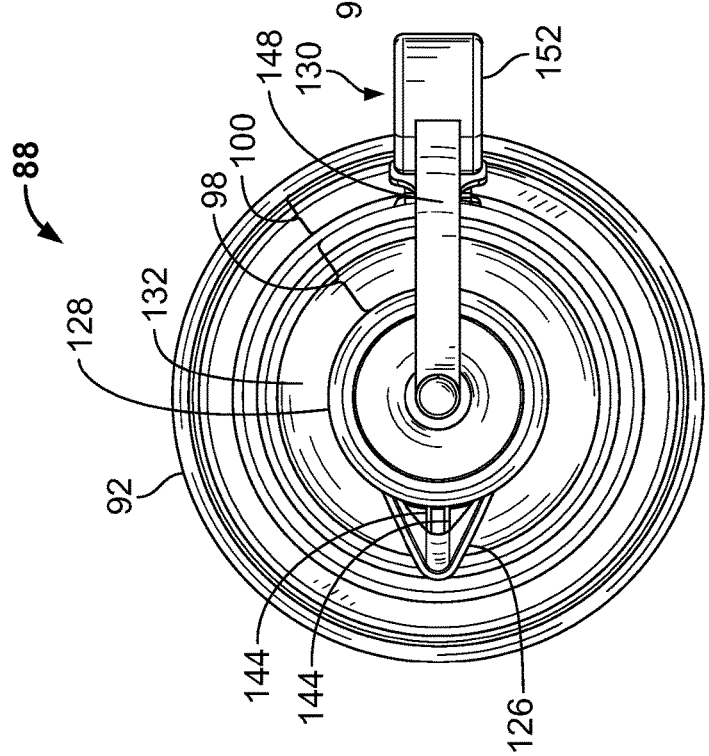

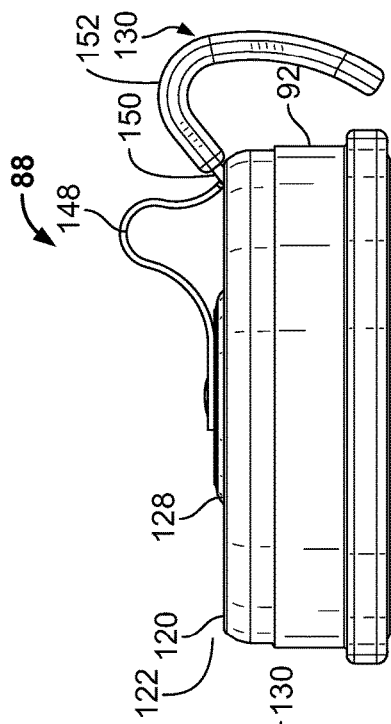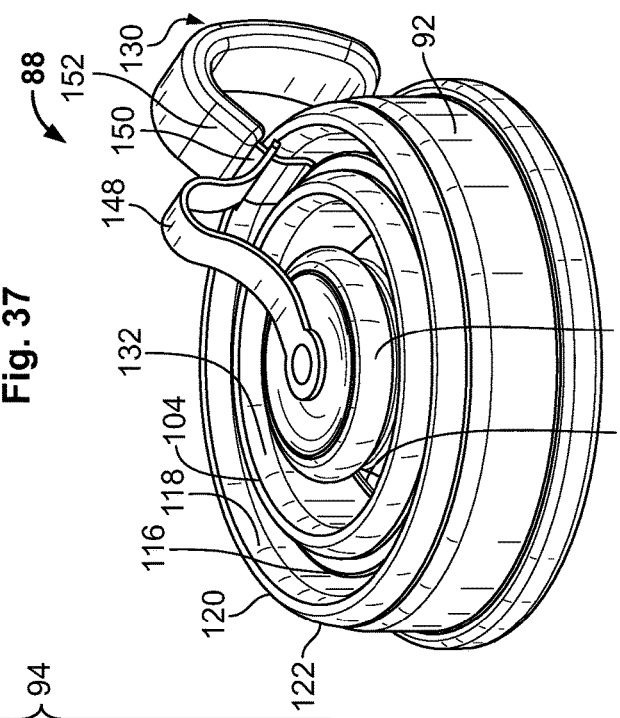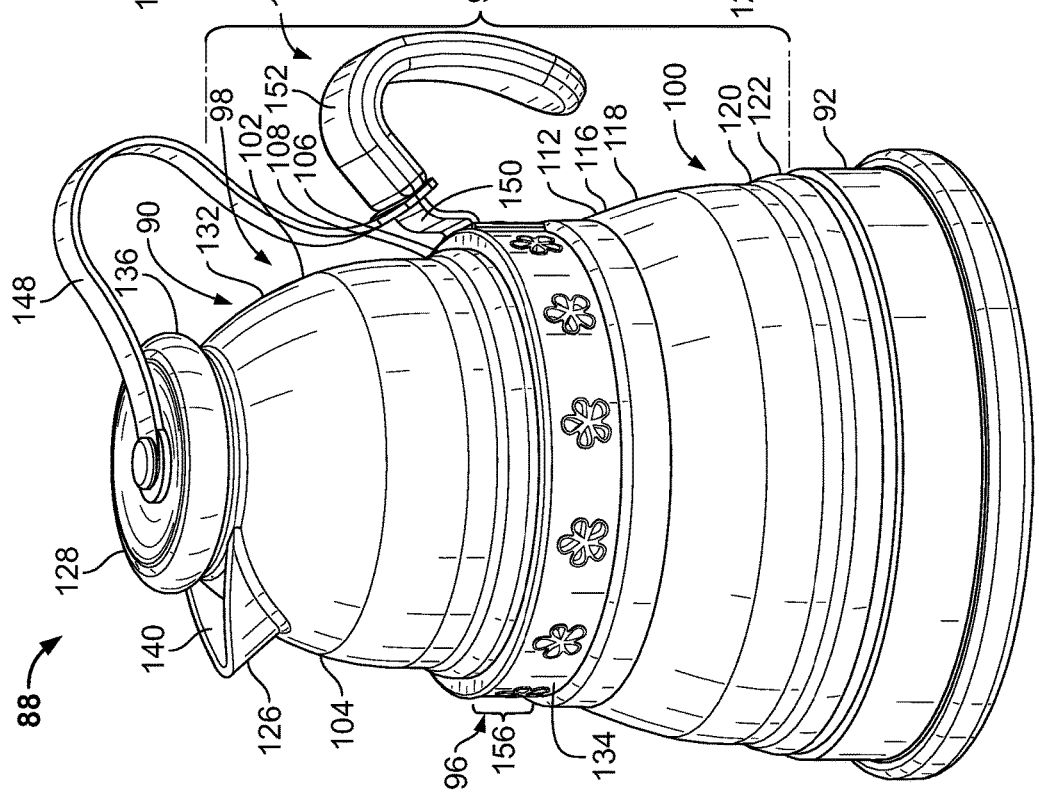

COLLAPSIBLE HEATABLE LIQUID CONTAINERS

CROSS REFERENCE TO RELATED APPLICATIONS

This application claims priority under 35 U.S.C. § 119 to German patent application DE 20 2015 102 788.5, filed May 29, 2015, the entire contents of which are incorporated herein by reference.

FIELD OF THE INVENTION

The present invention relates to collapsible liquid containers. In particular, it relates to collapsible cooking, serving, and drinking vessels such as bottles, kettles, pans, and the like that are suitable for heating liquid as well as for holding hot consumable or cooking liquid.

BACKGROUND

Heat-resistant and heatable liquid containers are essential to the enjoyment of many consumable foods and beverages, such as hot tea, coffee, soups, and boiled solid foods such as pastas, eggs, cereal grains, meats, and vegetables. However, such containers are typically formed of a rigid material to allow them to be held and to sit on a flat surface without spilling. Furthermore, many structural features that are typically desired in such containers, such as handles, spouts, and a broad, perhaps rounded midsection (as is common for a tea kettle, for example) with narrower top and bottom sections to minimize a surface area-to-volume ratio to promote heat retention, are at the same time undesirable for storage compactness. Such containers do not lend themselves to stacked nesting, and their generally convex wall profile typically lacks a mating counterpart among other containers of the same or different type, resulting in much unusable storage space inside and adjacent each container.

A need therefore exists for heat-resistant and heatable liquid containers that are suitable for holding hot consumable and cooking fluids; self-supporting and stable when placed on a flat surface, when carried, and when tilted for pouring; and compact when stored.

SUMMARY OF THE INVENTION

In accordance with an embodiment of the invention, a collapsible liquid container is provided. The container includes a generally annular, stiff top tier; a bottom tier including an imperforate bottom surface; and a collapsible wall section connecting the top tier to the bottom tier, the collapsible wall section including at least three stacked, generally annular tiers. Collectively, the collapsible wall section, top tier, and bottom tier define a watertight container body having a container volume in fluid communication with a fluid opening. At least one of collapsible wall section tiers is a stiff middle tier, and at least two of the collapsible wall section tiers are flexible and configured to fold between relatively expanded and relatively collapsed positions, including at least one flexible tier disposed above the middle tier and at least one flexible tier disposed below the middle tier, the flexible tiers being composed of a flexible material and the middle tier being composed of a stiff material. Thus, the size of the container volume can be increased by folding at least one of the flexible tiers from a relatively collapsed to a relatively expanded position and can be decreased by folding at least one of the flexible tiers from a relatively expanded to a relatively collapsed position. The top tier is at least partially inserted into the middle tier when collapsed, and the bottom tier is at least partially inserted into the middle tier when collapsed.

In one embodiment, the fluid opening is disposed in the top tier and configured to be opened and closed to selectively allow and restrict the flow of fluid into and out of the container body through the fluid opening. Opening and closing could be performed by raising and lowering a hinged lid, removing and replacing a removably secured lid, or opening and closing an attached valve, which may be built into a lid. Where a lid is included, a lid retention member is preferably permanently attached to the lid and to the container body for loss prevention when the lid is opened. The retention member may, for example, be a flexible tether connected at one end to a collar around a neck of the container and at another end to the lid, preferably by a rotatable joint if the lid is a screw cap.

According to another aspect of the invention, a collapsible kettle is provided. The kettle includes a generally annular top tier that is stiff (i.e., stiff or rigid), a bottom tier including an imperforate bottom surface, and a collapsible wall section connecting the top tier to the bottom tier. The collapsible wall section includes at least three stacked, generally annular tiers. Collectively, the collapsible wall section, top tier, and bottom tier define a watertight container body having a container volume in fluid communication with a top opening and a pour spout. At least one of collapsible wall section tiers is a stiff middle tier; and at least two of the collapsible wall section tiers are flexible and configured to fold between relatively expanded and relatively collapsed positions, including at least one flexible tier disposed above the middle tier and at least one flexible tier disposed below the middle tier, the flexible tiers being composed of a flexible material and the middle tier being composed of a stiff material. Thus, the size of the container volume can be increased by folding at least one of the flexible tiers from a relatively collapsed to a relatively expanded position and can be decreased by folding at least one of the flexible tiers from a relatively expanded to a relatively collapsed position. The top tier is at least partially inserted into the middle tier when collapsed.

In one embodiment, the kettle further comprises a top lid configured to removably cover its top opening, to permit easily filling the kettle with liquid through the top opening with the lid removed.

In alternative embodiments, the pour spout may be either a V-spout or a gooseneck spout. A V-spout will be understood to be a generally V-shaped wall structure protruding radially outwardly from the top tier to define a spout channel. A gooseneck spout will be understood to comprise an elongate spout tube in fluid communication with the container body at a lower end, for example, through an opening in the lower or middle tier, and leading to a pour opening at an upper end. If the spout tube is connected to the middle tier, the bottom tier should insert into the middle tier when collapsed, so as not to impinge upon the spout tube. Conversely, although not shown in the drawings, in an embodiment with a spout tube connected to the lower tier, the middle tier would advantageously be configured to insert into the bottom tier when collapsed. The spout tube may be removably connected or permanently attached to the container body.

Preferably, the bottom tier is composed of an electrically resistive and ferromagnetic material, so that an induction cooker induces currents in the material, and the induced currents generate heat to heat a liquid within the kettle.

According to another aspect of the invention, a flame-heatable collapsible liquid container is provided. The liquid container could take the form of a bottle, a kettle, or other desired form. A stiff bottom tier of the container is composed of a thermally conductive, flame resistant material configured to conduct heat from a flame to a liquid in the container. The bottom tier may comprise a downwardly extending peripheral flange configured to shield flexible tiers of the container from direct exposure to flame when the bottom tier is heated over a flame. The flange may be a permanent feature or a removable attachment of the bottom tier.

In some embodiments of the invention as described above, an exposed surface of the bottom tier may be composed of any material with suitable thermal conductivity for receiving a contact or flame heat flux from a heat source and passing a desired amount of the heat flux into a liquid in the container through conduction and/or convection to heat the liquid, such as a copper, aluminum, or cast iron material commonly used in cookware. The exposed surface may also be ferromagnetic and electrically resistive, so as to be adapted for induction heating. One example of a suitable inductively heatable material is stainless steel.

BRIEF DESCRIPTION OF THE DRAWINGS

FIG. 1 is a top plan view of a collapsible heatable bottle according to an embodiment of the invention.

FIG. 2 is a bottom plan view of the collapsible heatable bottle depicted in FIG.

FIG. 3 is a side elevation view of the collapsible heatable bottle depicted in FIG. 1.

FIG. 4 is a top perspective view of the collapsible heatable bottle depicted in FIG. 1.

FIG. 5 is a bottom perspective view of the collapsible heatable bottle depicted in FIG. 1.

FIG. 6 is a side elevation view of the collapsible heatable bottle depicted in FIG. 1, shown in a fully collapsed state.

FIG. 7 is a top perspective view of the collapsible heatable bottle depicted in FIG. 1, shown in a fully collapsed state.

FIG. 8 is a bottom perspective view of the collapsible heatable bottle depicted in FIG. 1, shown in a fully collapsed state.

FIG. 12 is a side elevation view of the collapsible heatable bottle depicted in FIG. 1, shown in a collapsed-top-tier state.

FIG. 13 is a front elevation view of the collapsible heatable bottle depicted in FIG. 1, shown in a collapsed-top-tier state.

FIG. 25 is a top perspective view of the collapsible heatable bottle as depicted in FIG. 19, in a collapsed-bottom-tier state.

FIG. 26 is a top perspective view of the collapsible heatable bottle as depicted in FIG. 19, in a collapsed-top-tier state.

FIG. 34 is a top plan view of a collapsible heatable kettle with a V-spout according to another embodiment of the invention.

FIG. 35 is a side elevation view of the collapsible heatable kettle shown in FIG. 34.

FIG. 36 is a top perspective view of the collapsible heatable kettle shown in FIG. 34.

FIG. 37 is a side elevation view of the collapsible heatable kettle shown in FIG. 34, in a fully collapsed state.

FIG. 38 is a top perspective view of the collapsible heatable kettle shown in FIG. 34, in a fully collapsed state.

DETAILED DESCRIPTION OF THE INVENTION

Figure 10:
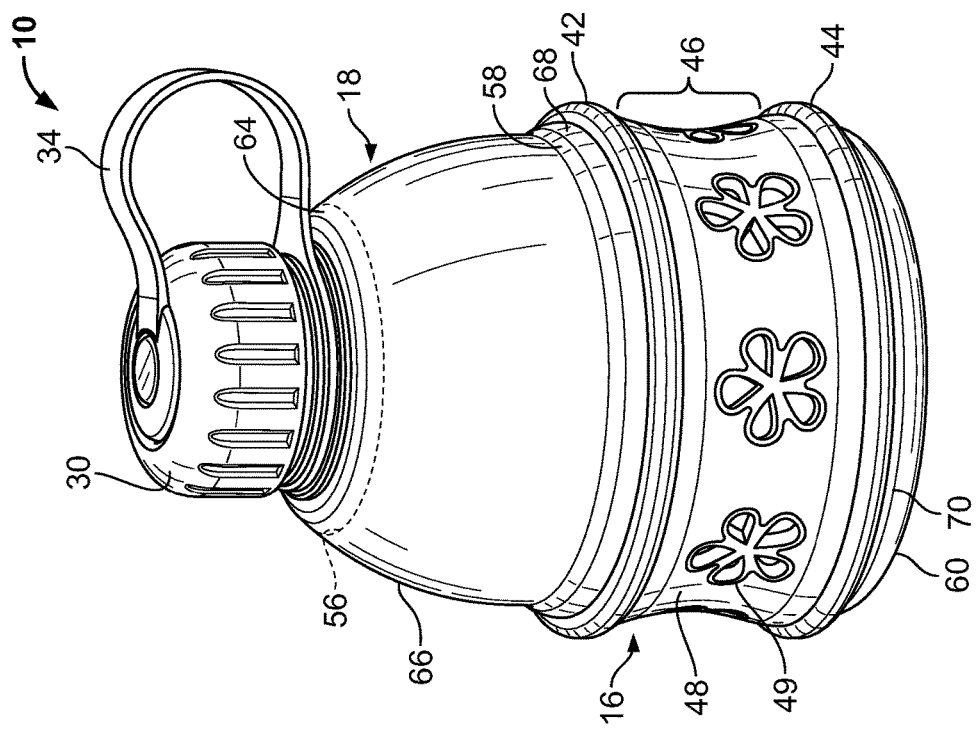
FIG. 10 is a top perspective view of the collapsible heatable bottle depicted in FIG. 1, shown in a collapsed-bottom-tier state.

Heat-resistant and heatable collapsible liquid vessels according to the invention will now be described in detail. The containers generally have a tiered wall structure that alternates between non-inverting tiers, which are typically relatively stiff, and inverting flexible tiers connected to the non-inverting tiers, typically by overmolding. Each flexible tier includes one or more living hinges (typically a thinned or otherwise weakened band of the tier) permitting the tier to snap between locally stable, relatively expanded and collapsed states. In general, at least a portion of the flexible tier is inverted from one state to the other state, such that its upper end becomes its lower end, an outwardly facing surface becomes an inwardly facing surface, and an inwardly facing surface becomes an outwardly facing surface. At least a bottom one of the stiff tiers is typically composed of a material having properties desired for an applicable heating application. The desired material is highly thermally conductive, and in some embodiments the material is ferromagnetic and electrically resistive for induction cooking applications. Metallic materials such as stainless steel are typically suitable for forming the bottom tier, but certain polymers, ceramics, and other types of solid materials and composites may also have the desired thermal and electro-magnetic properties. The top and middle tiers should be heat resistant and at least stiff enough to generally retain their shape when the vessel is lifted or poured from, but they do not need to be thermally conductive, and in some cases it may be preferable for them to be thermally insulating.

In the context of vessels according to the present invention, as in common parlance, it will be understood that "stiff," "rigid," and "flexible" are relative terms. Thus unless further specified, referring to a tier of a wall structure as "stiff" herein simply means, at a minimum, that the tier is stiff enough to impart a force to its neighboring flexible tier or tiers sufficient to fold the flexible tier or tiers between relatively folded and unfolded stable positions (optionally causing the flexible tiers to "snap" between positions), without itself folding (i.e., without inverting its vertical orientation, with respect to the top and bottom of the container). The term "stiff" will be understood to apply to both "stiff" and "rigid" materials, when not inconsistent with the relevant context. A "stiff" tier may be appreciably deformable, but does not tend to fold over upon itself or its neighboring tiers.

On the other hand, a tier that is called "rigid" for purposes of the invention typically will not appreciably yield or deform, let alone fold, in the direction of the force imparted to fold the flexible tiers, in response to either that force or other typical loads associated with normal use of the container. Still further, a rigid tier preferably will not appreciably deform in any direction during normal use of the container. A "rigid" tier that exhibits the latter characteristic of not appreciably deforming in any direction is typically formed of a different material than the flexible tiers, rather than the same material in a different size or geometric configuration.

Although each inverting/flexible tier of the various household containers described herein is illustrated as primarily having two stable positions, it is also within the scope of the invention to provide one or more flexible tiers having a plurality of stable partially expanded positions, for example by providing one or more flexible tiers having a stepped profile comprising a series of accordion-like pleats of flexible material, the pleats comprising peripheral bands of material oriented in alternating directions and connected to adjacent bands by living hinges, so that each pleat can be independently folded and unfolded (not shown), being stable in either state. One or more successive accordion pleats may be stable in relatively "bent" or "tilted" orientations, in which part of the circumferential length of a pleat is folded, part of the length is unfolded, and the folded and unfolded regions are connected by twisted regions. Also, a wall structure of a vessel according to the invention need not have the exact shape shown in the drawings, but may have any suitable shape, such as round, oval, rectangular with rounded corners, or other shape as desired.

The illustrated embodiments of collapsible liquid vessels according to the invention described below, with reference to the accompanying drawings, are a heatable bottle; a flame-heatable bottle; a V-spout kettle, and a gooseneck-spout kettle.

Collapsible Heatable Bottle

Figure 16:
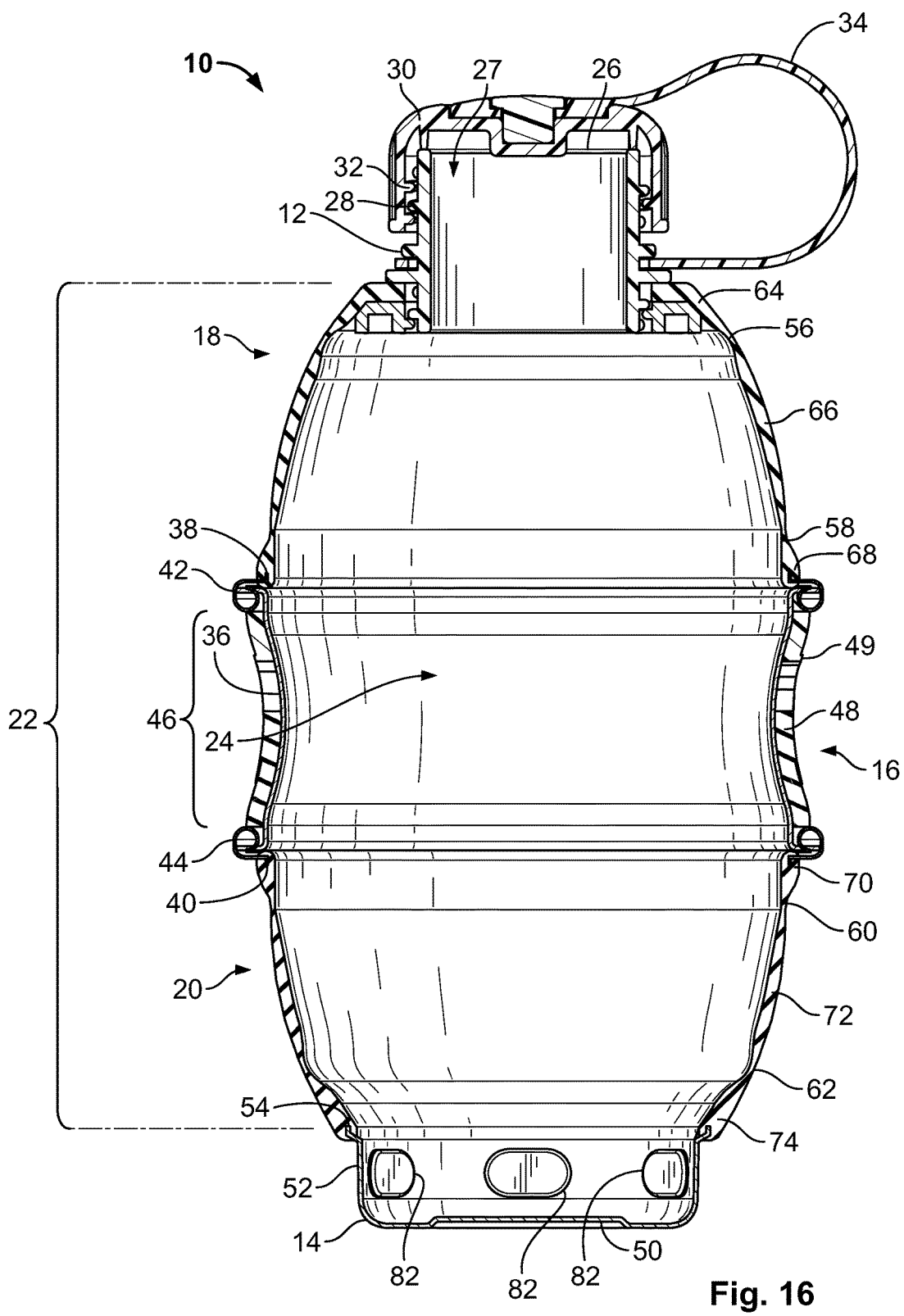
FIG. 16 is a cross sectional side elevation view of the collapsible heatable bottle depicted in FIG. 1.

With reference to FIGS. 1-17, a collapsible heatable bottle 10 according to an embodiment of the invention is described and illustrated. Bottle 10 includes a non-inverting top tier 12, a non-inverting bottom tier 14, and a non-inverting middle tier 16, as well as an upper inverting tier 18 and a lower inverting tier 20, which respectively link middle tier 16 to top and bottom tiers 12, 14. Middle tier 16 and upper and lower inverting tiers 18, 20 thus combine to form a collapsible wall section 22 that may be collapsed and expanded to vary the overall height dimension of bottle 10 and thus the volume of liquid that it may contain. Inverting tiers 18 and 20, as well as the inverting tiers of other embodiments illustrated or contemplated by this description, may typically be formed of a flexible, resilient, heat resistant polymer such as a silicone or an appropriate thermoplastic elastomer. Alternating tiers may be included in a collapsible wall section, preferably adhering to the alternating arrangement in which a flexible, inverting tier is connected above and below each stiff or rigid, non-inverting tier of the collapsible wall section. Bottom tier 14 comprises a generally flat, closed bottom surface, and successive tiers are joined by a watertight connection, such as by overmolding, so that an interior volume 24 of bottle 10, shown in FIG. 16, may be filled with liquid to the level of a rim 26 of top tier 12, defining a bottle opening 27, without leaking.

Top tier 12 includes exterior threads 28 to receive a sealing cap 30 having interior threads 32, to close and seal liquid within volume 24. Alternatively, though not shown, an upper tier may be covered and/or sealed by other suitable means, including but not limited to a cap with interior threads, a deformable inserted plug or cork stopper, or a deformable female cap or cover designed to stretch over or snap onto an upper rim of a collapsible bottle top tier. Preferably, cap 30 remains permanently connected to bottle 10, even when not covering opening 27, such as by a loss-prevention tether 34 as shown in the drawings. Top tier 12 should be formed of a heat-resistant, food-safe material suitable for holding and drinking hot beverages, which may for example be a stiff polymer such as polypropylene or HDPE.

Middle tier 16 comprises a stainless steel annular band 36 including thin wall sections 38 and 40 to which respective upper and lower inverting tiers 18 and 20 are overmolded, and upper and lower curled regions 42 and 44 defining an annular exterior channel 46 between them. An elastic, thermally insulating band 48, which may for example be a resilient polymer similar to that of upper and lower inverting tiers 18 and 20, is seated in channel 46, serving as a convenient hand grip that is insulated from channel 46 to promote heat retention within bottle 10 and to inhibit burns caused by a user's hand touching the base of channel 46. Textured features 49 formed in band 48 may facilitate gripping or simply provide decorative ornamentation. In an alternative embodiment not shown, a middle tier may be formed entirely of a stiff or rigid thermally insulating material.

Bottom tier 14 is a round bowl-shaped stainless steel member including a generally flat bottom section 50 surrounded by an upstanding peripheral wall section 52, lower inverting tier 20 being overmolded onto a top edge 54 of wall section 52. Stainless steel is a preferred material for bottom tier 14 because of its magnetic and electrical properties (ferromagnetic with high electrical resistance), which make it suitable for induction heating. Thus, when bottle 10 is placed on an induction plate/cooktop range (not shown), induced electrical currents in bottom tier 14 generate heat therein, which may be transferred from bottom tier 14 to liquid contents of bottle 10 by conduction and/or convection. For example, tea, coffee, hot chocolate, or soup may be conveniently heated in bottle 10 in this manner. Alternatively, bottle 10 may be placed on an electric stove or hotplate so that heat is conducted from the hotplate into bottom tier 14.

Consistent snap-through action in expanding and collapsing upper and lower inverting tiers 18 and 20 is promoted by living hinges 56 and 58 in upper inverting tier 18, and living hinges 60 and 62 in lower inverting tier 20, which may be formed, for example, as localized bands of material where the wall thickness of inverting tiers 18 and 20 is reduced. A connecting band 64 of upper inverting tier 18 is overmolded onto top tier 12, living hinge 56 is formed between connecting band 64 and an invertible band 66 of upper inverting tier 18, and living hinge 58 is formed between invertible band 66 and a connecting band 68 of upper inverting tier 18, which in turn is overmolded onto thin wall section 38 of middle tier 16. Likewise, a connecting band 70 of lower inverting tier 20 is overmolded onto thin wall section 40 of middle tier 16, living hinge 60 is formed between connecting band 70 and an invertible band 72 of lower inverting tier 20, and living hinge 62 is formed between invertible band 72 and a connecting band 74 of lower inverting tier 20, which in turn is overmolded onto top edge 54 of bottom tier 14. This permits inverting tiers 18 and 20 to readily fold at living hinges 56, 58, 60, and 62, inverting invertible bands 66 and 72 while connecting bands 64, 68, 70, and 74 remain generally upright, to reduce the overall height of bottle 10. Thus, from a fully expanded state of bottle 10 best seen in FIGS. 3-5 and 16, bottle 10 may be converted to a fully collapsed state as in FIGS. 6-8 and 17 or to either of two partially collapsed states shown in FIGS. 9-11 (collapsed lower inverting tier 20) and 12-15 (collapsed upper inverting tier 18), respectively.

Figure 17:
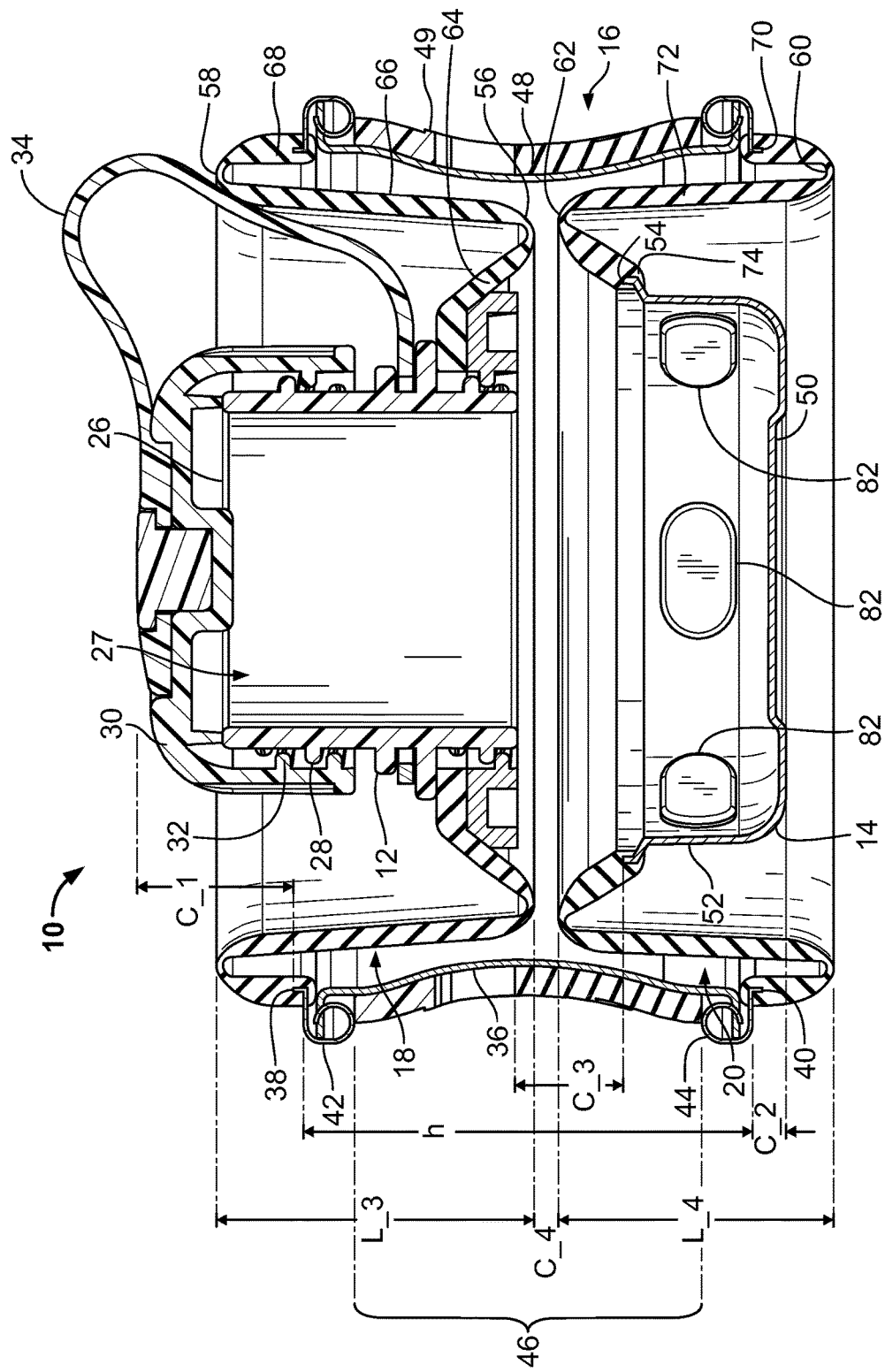
FIG. 17 is a cross sectional side elevation view of the collapsible heatable bottle depicted in FIG. 1, shown in a fully collapsed state.
Figure 18:
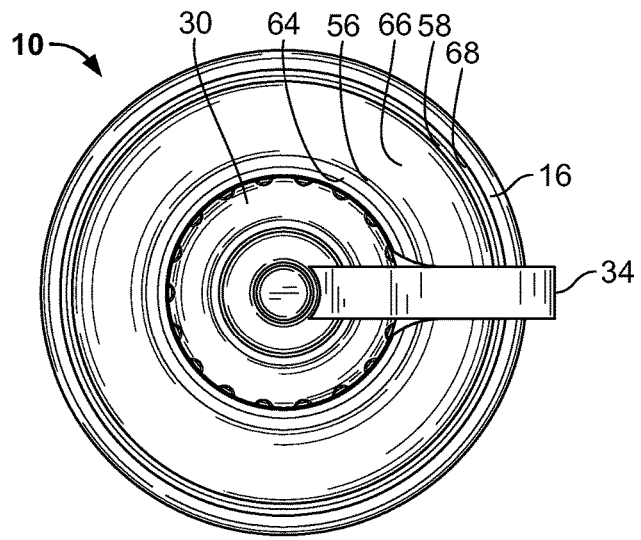
FIG. 18, same as FIG. 1, is a top view of the collapsible heatable bottle depicted in FIG. 1, including a flame guard bottom attachment.
Figures 19, 20:
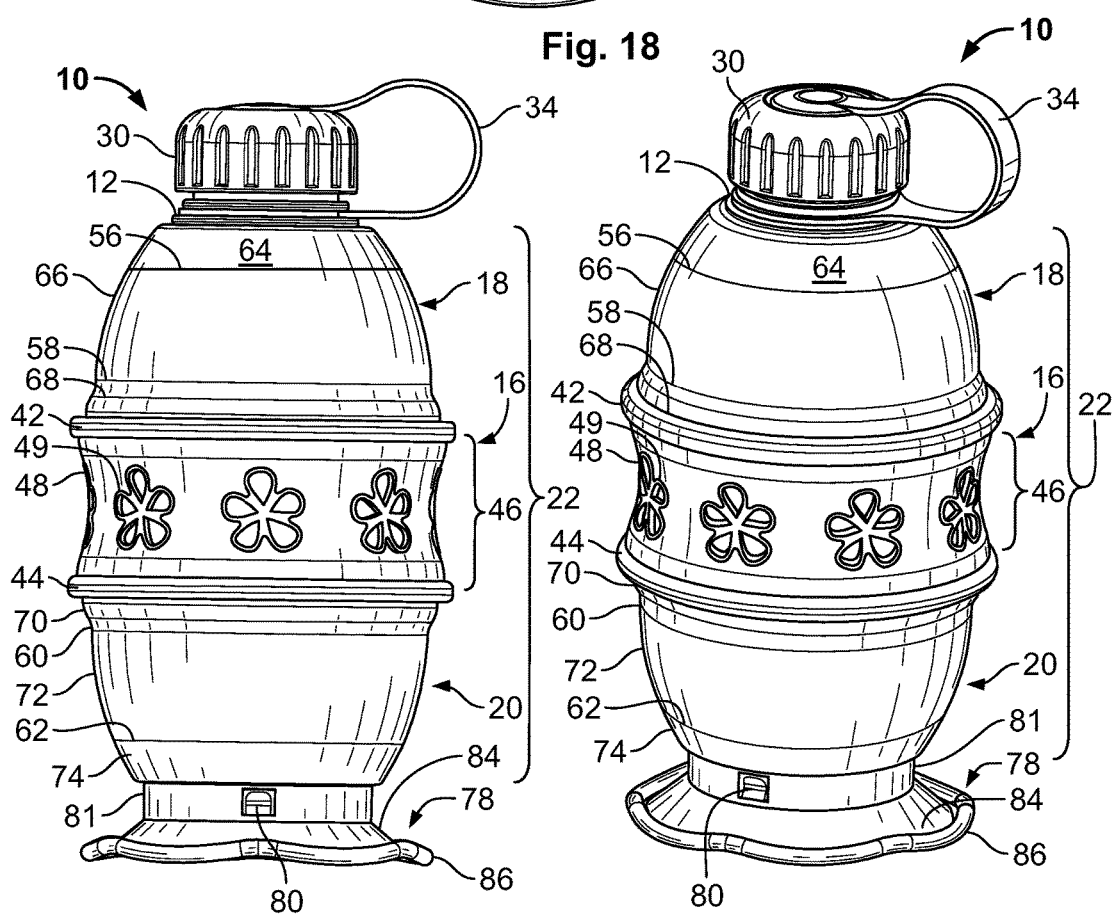
FIG. 19 is a side elevation view of the collapsible heatable bottle depicted in FIG. 1, including a flame guard bottom attachment.
FIG. 20 is a top perspective view of the collapsible heatable bottle as depicted in FIG. 19.
Figure 21:
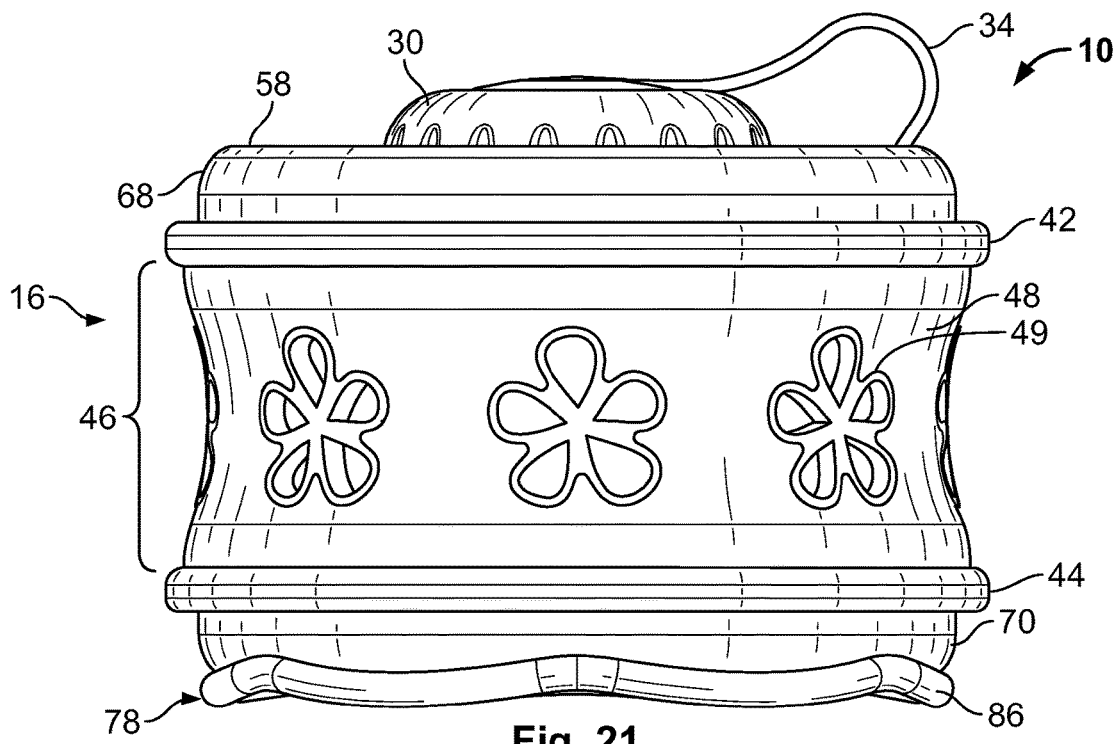
FIG. 21 is a side elevation view of the collapsible heatable bottle as depicted in FIG. 19, in a fully collapsed state.
Figure 22:
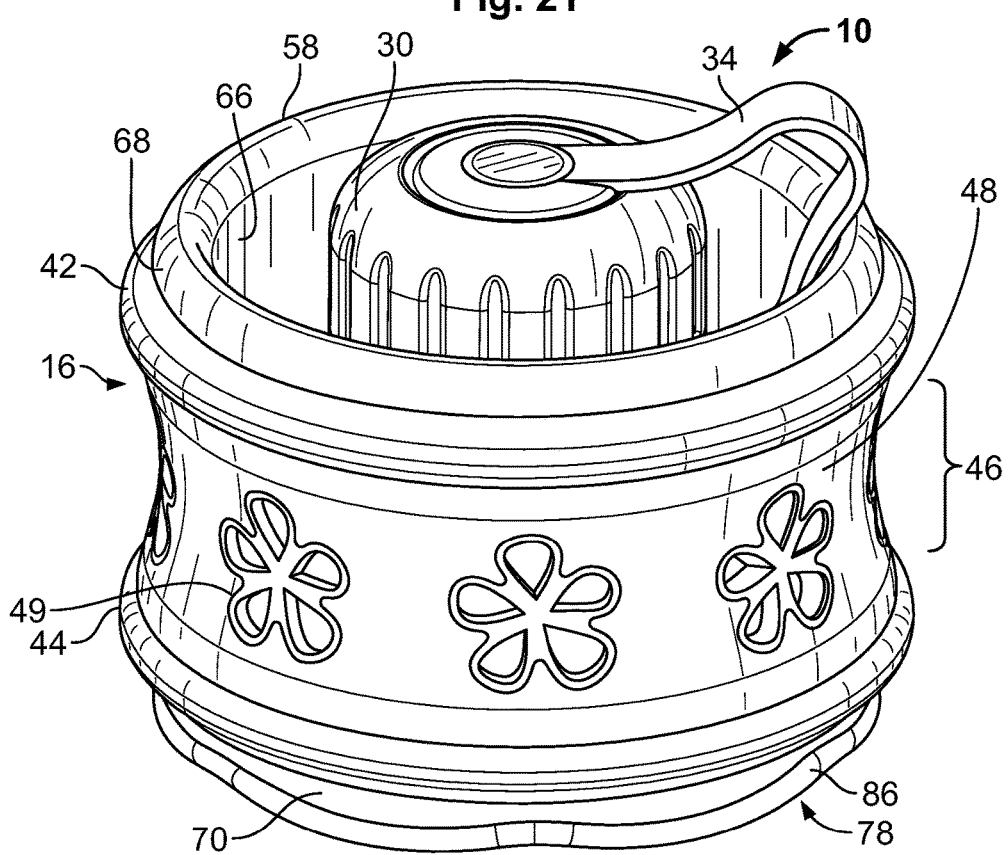
FIG. 22 is a top perspective view of the collapsible heatable bottle as depicted in FIG. 19, in a fully collapsed state.
Figure 24:
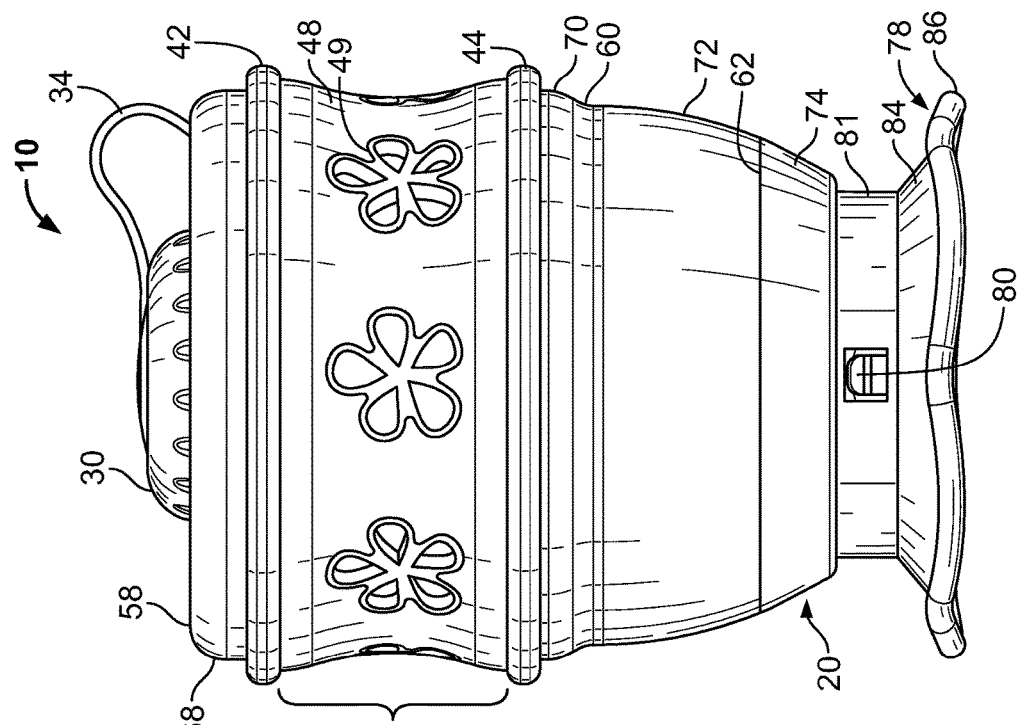
FIG. 24 is a side elevation view of the collapsible heatable bottle as depicted in FIG. 19, in a collapsed-top-tier state.
Figure 23:
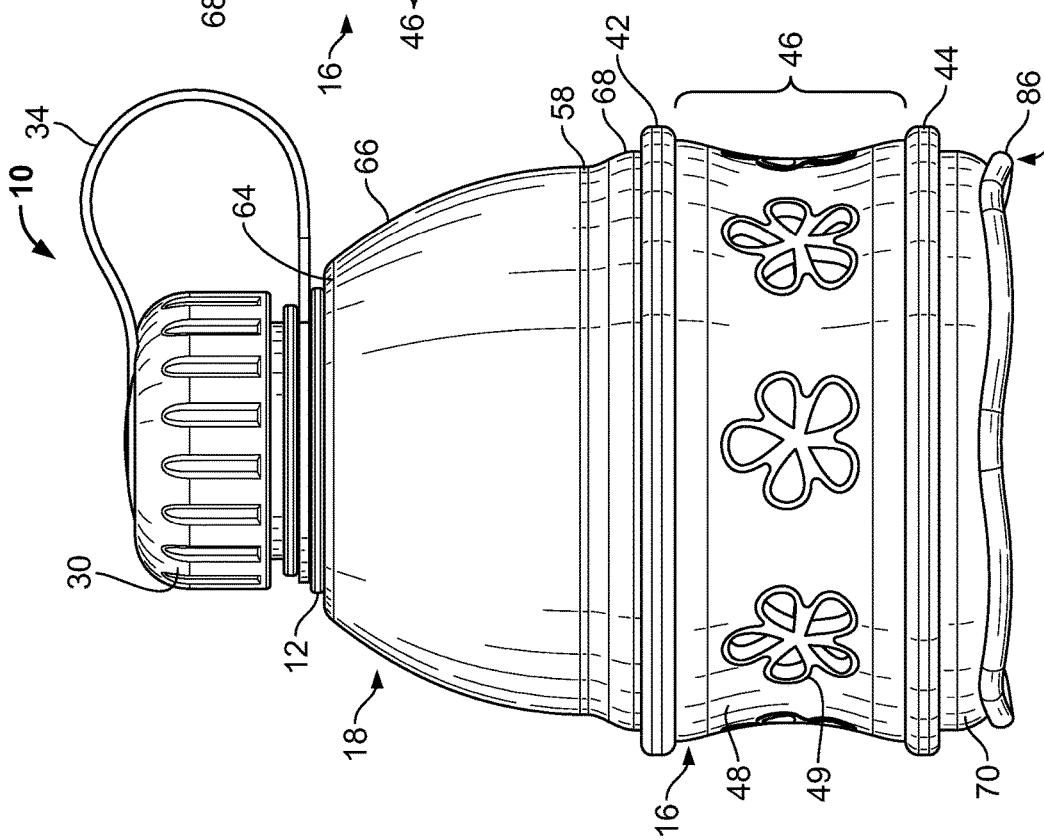
FIG. 23 is a side elevation view of the collapsible heatable bottle as depicted in FIG. 19, in a collapsed-bottom-tier state.
Figure 27:
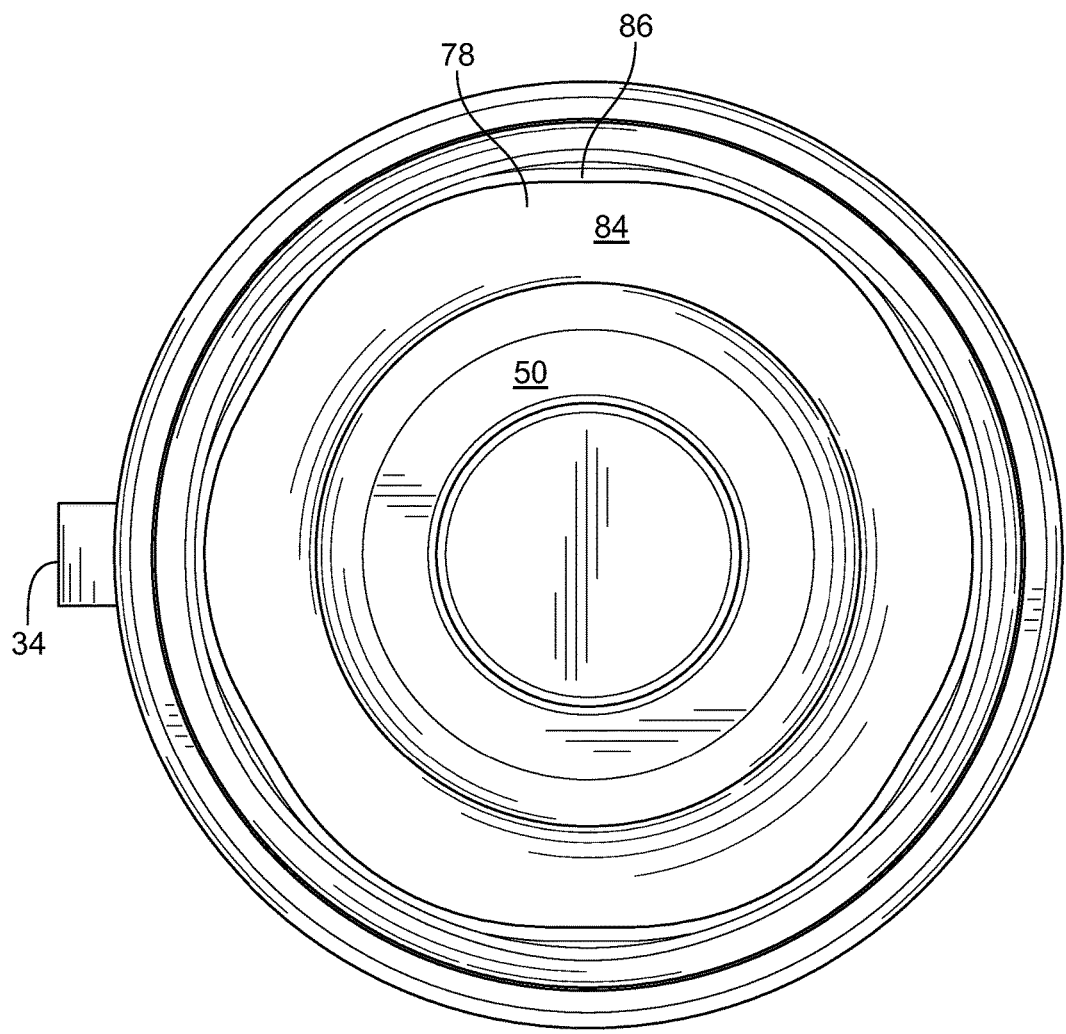
FIG. 27 is a bottom plan view of the collapsible heatable bottle as depicted in FIG. 19.
Figure 28:
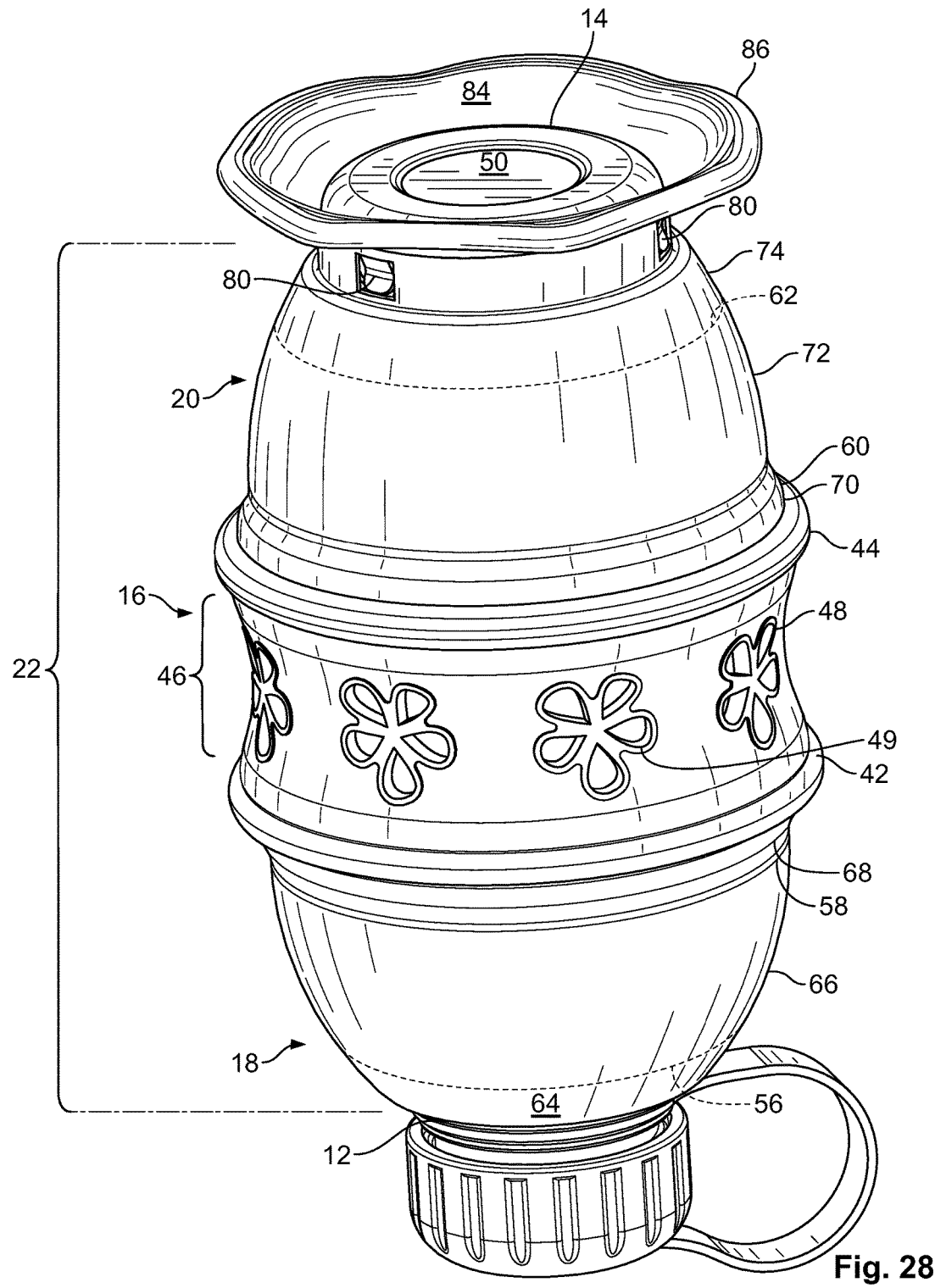
FIG. 28 is a bottom perspective view of the collapsible heatable bottle as depicted in FIG. 19.
Figure 29:
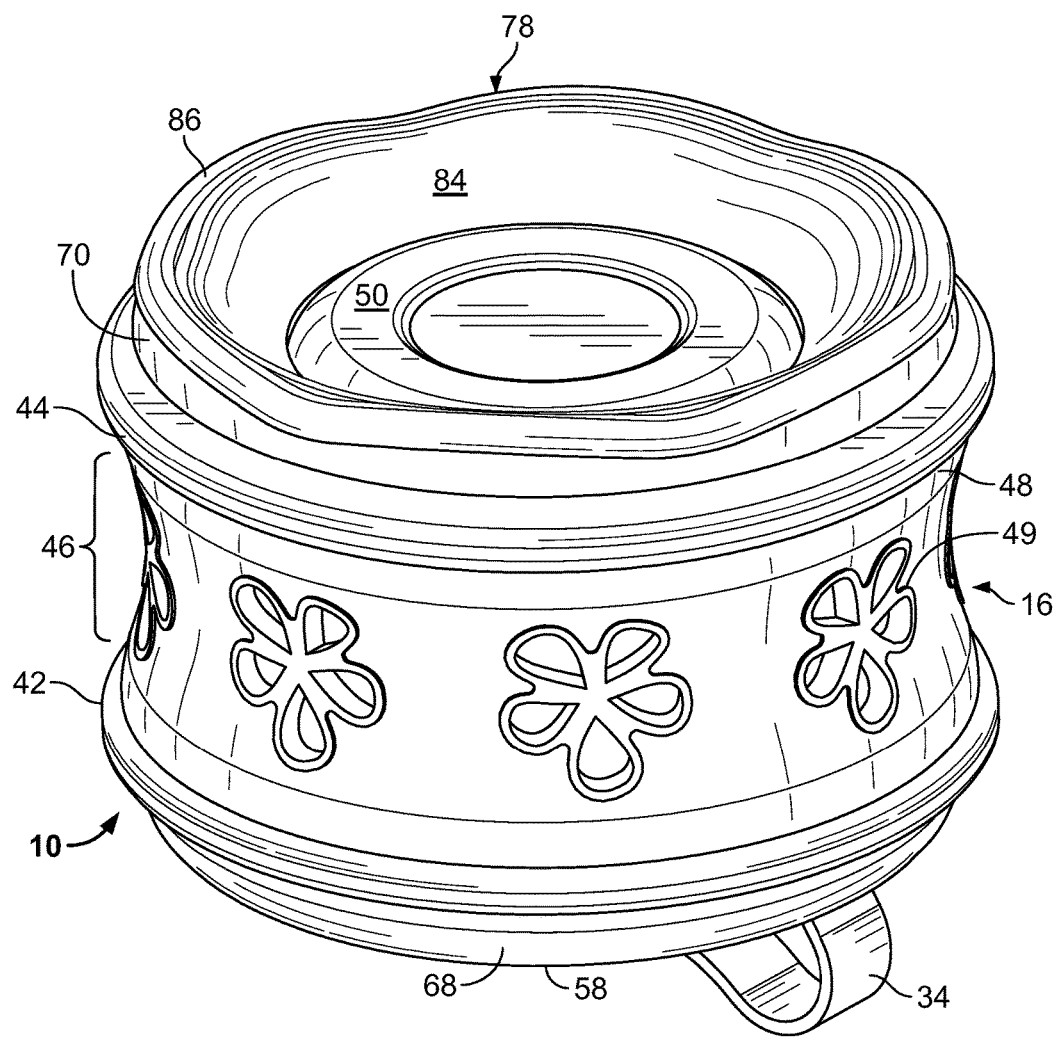
FIG. 29 is a bottom perspective view of the collapsible heatable bottle as depicted in FIG. 19, in a fully collapsed state.
Figure 30:
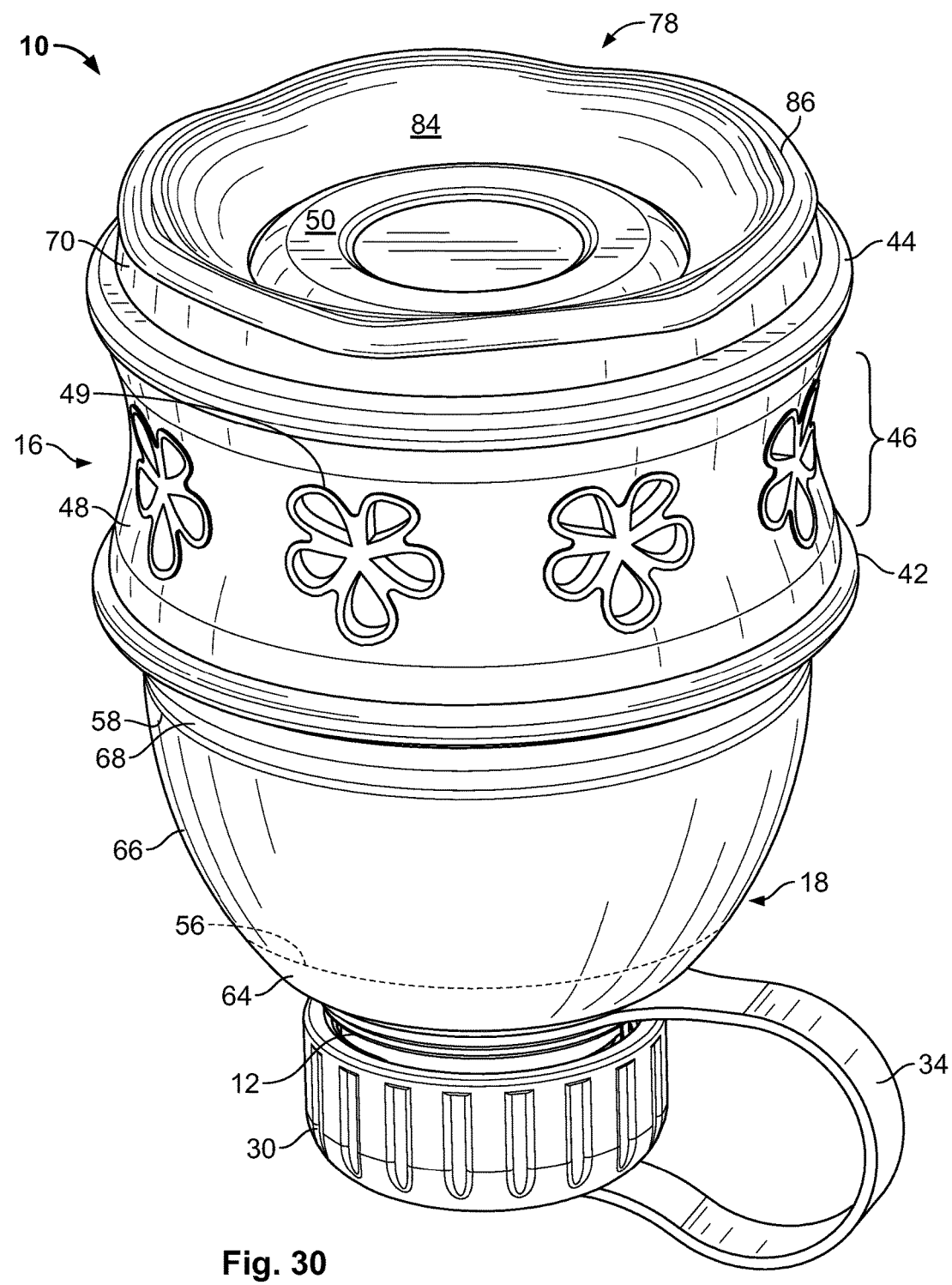
FIG. 30 is a bottom perspective view of the collapsible heatable bottle as depicted in FIG. 19, in a collapsed-bottom-tier state.
Figure 31:
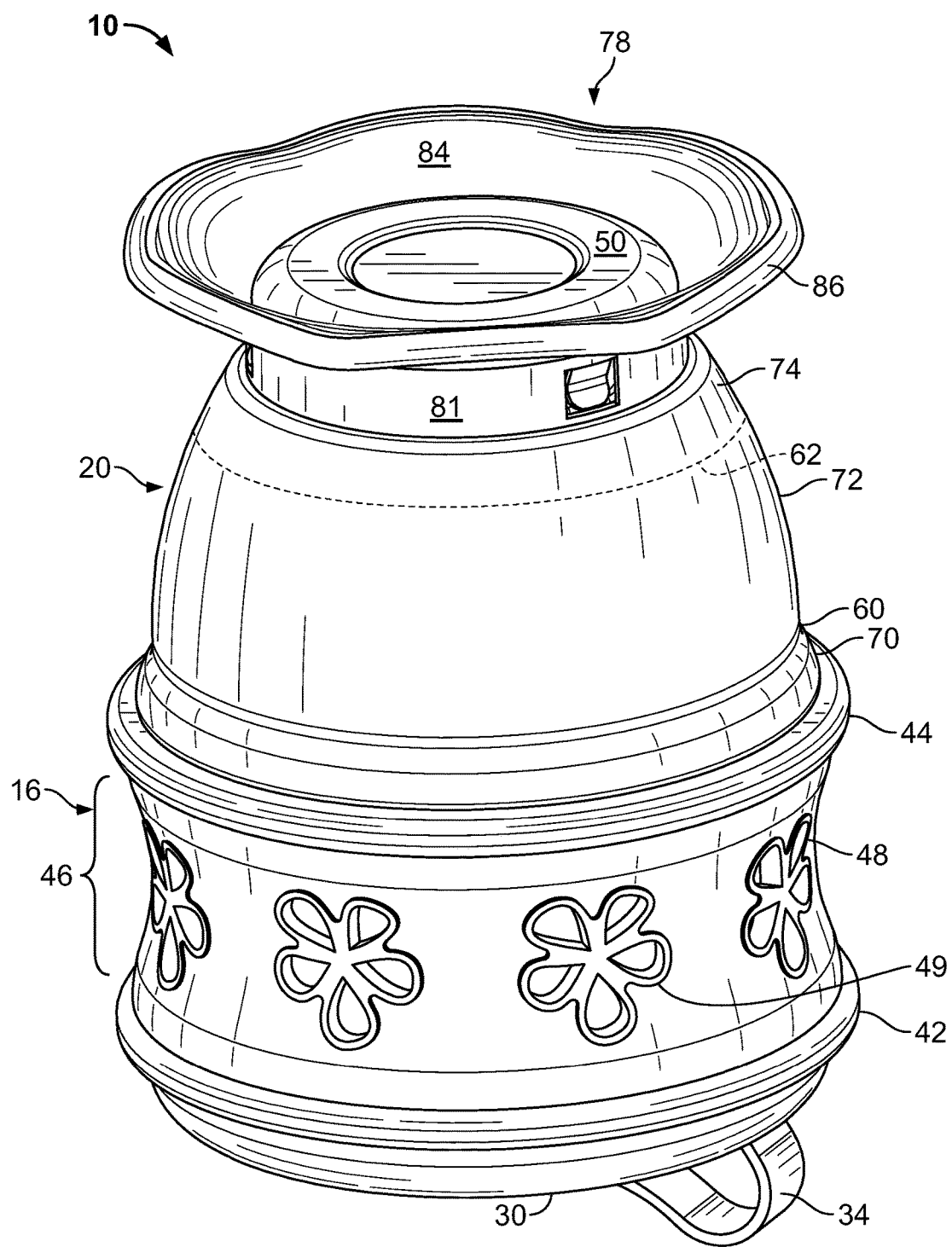
FIG. 31 is a bottom perspective view of the collapsible heatable bottle as depicted in FIG. 19, in a collapsed-top-tier state.
Figure 32:
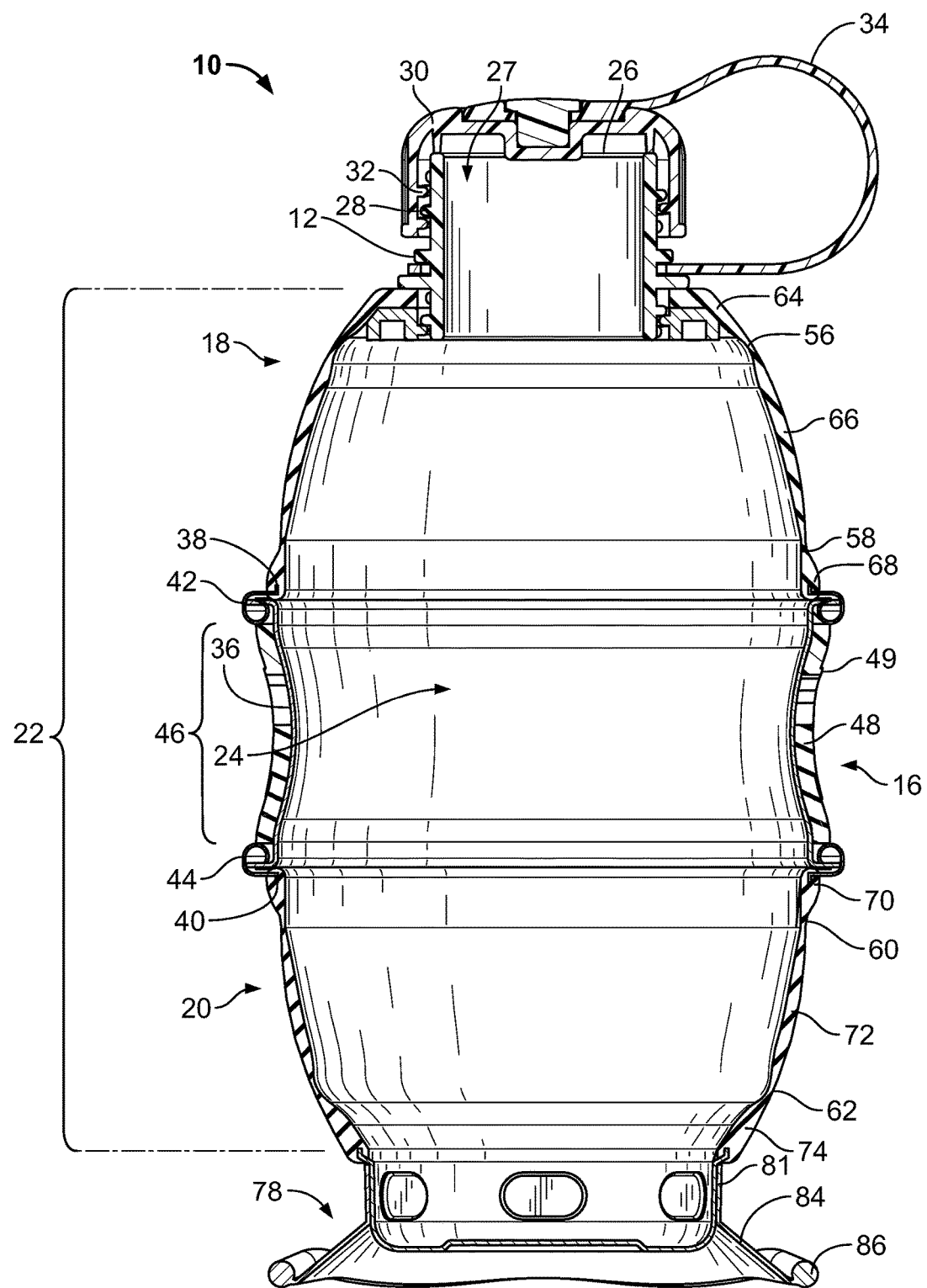
FIG. 32 is a cross-sectional side elevation view of the collapsible heatable bottle as depicted in FIG. 19.
Figure 33:
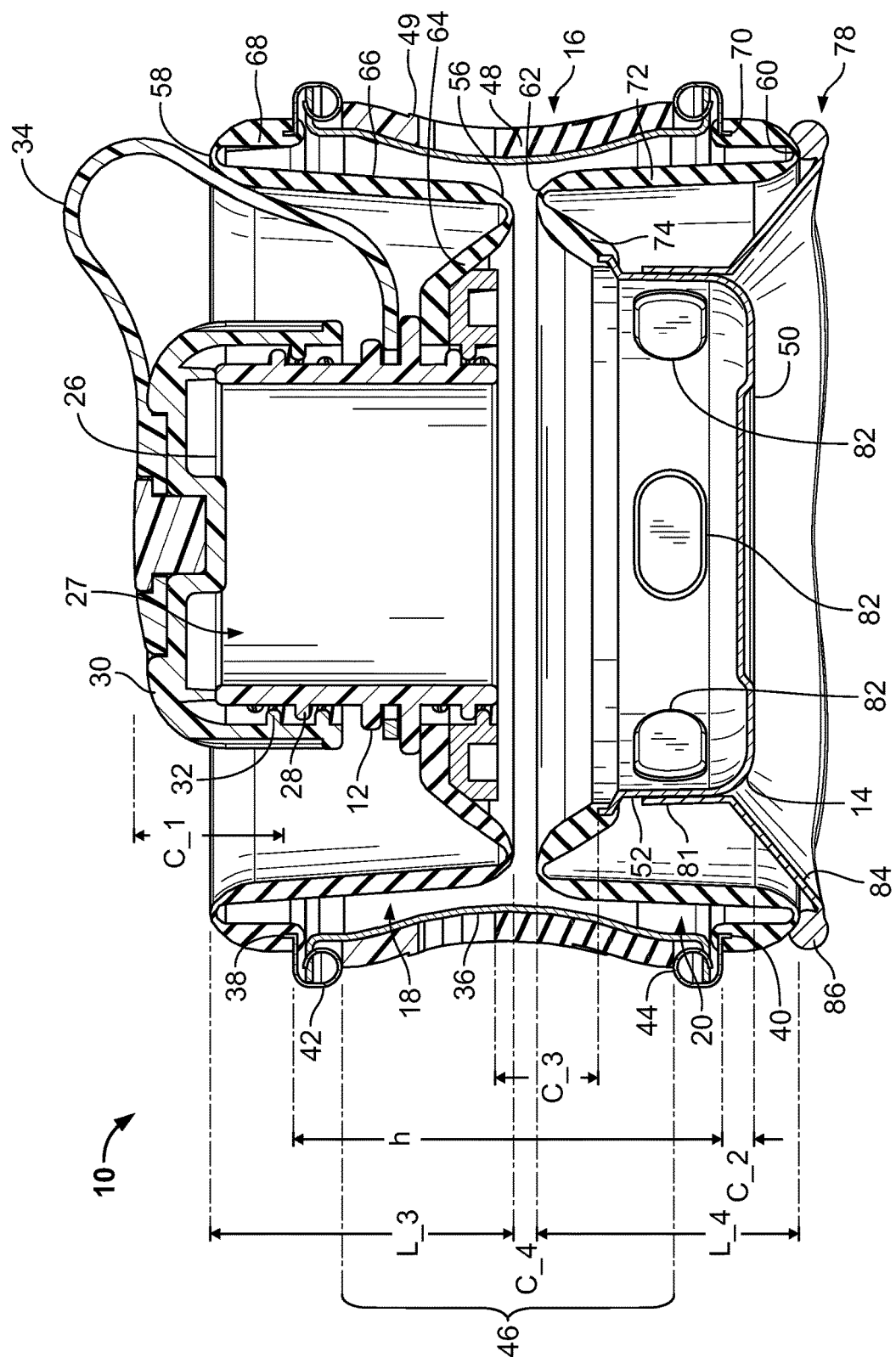
FIG. 33 is a cross-sectional side elevation view of the collapsible heatable bottle as depicted in FIG. 19, in a fully collapsed state.
Figure 39:
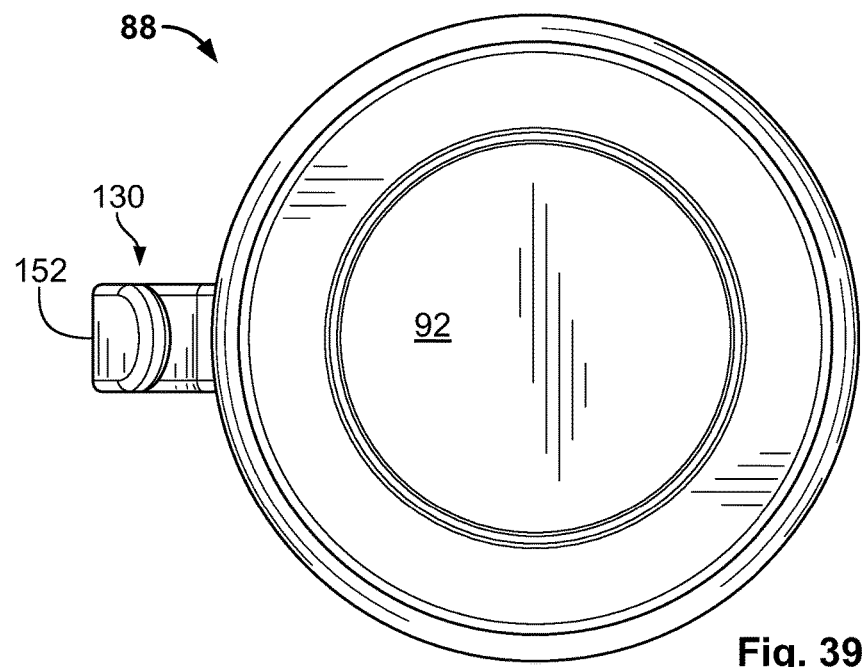
FIG. 39 is a bottom plan view of the collapsible heatable kettle shown in FIG. 34.
Figure 40:
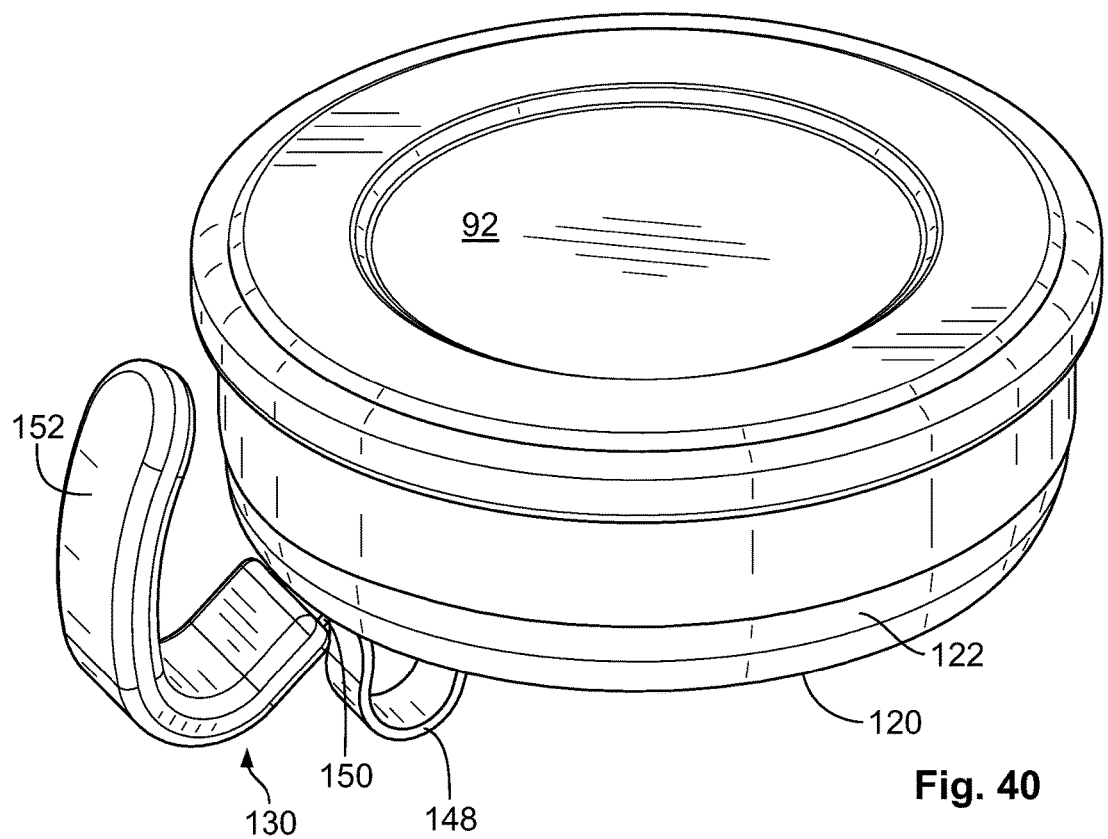
FIG. 40 is a bottom perspective view of the collapsible heatable kettle shown in FIG. 34, in a fully collapsed state.
Figure 41:
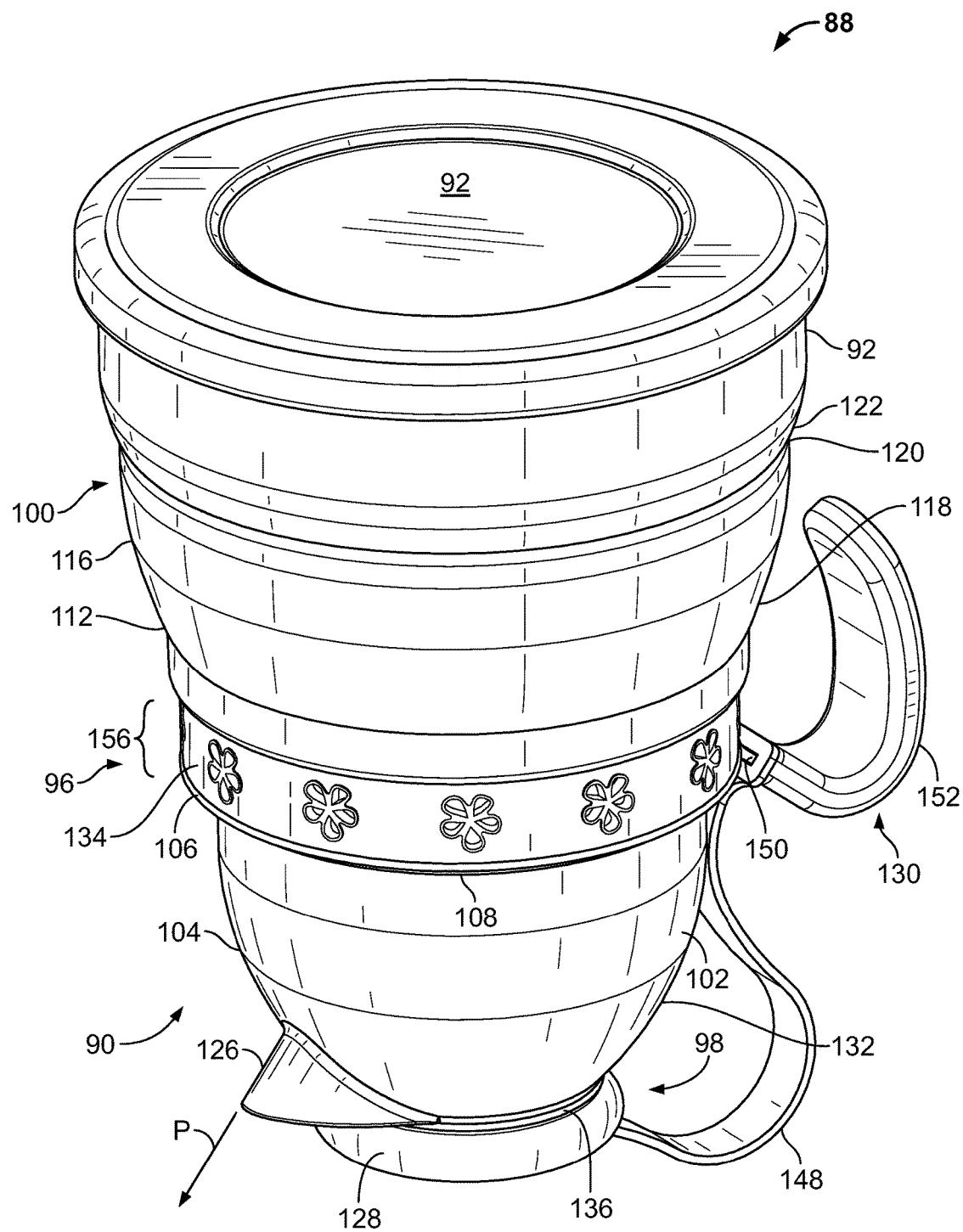
FIG. 41 is a bottom perspective view of the collapsible heatable kettle shown in FIG. 34.
Figure 42:
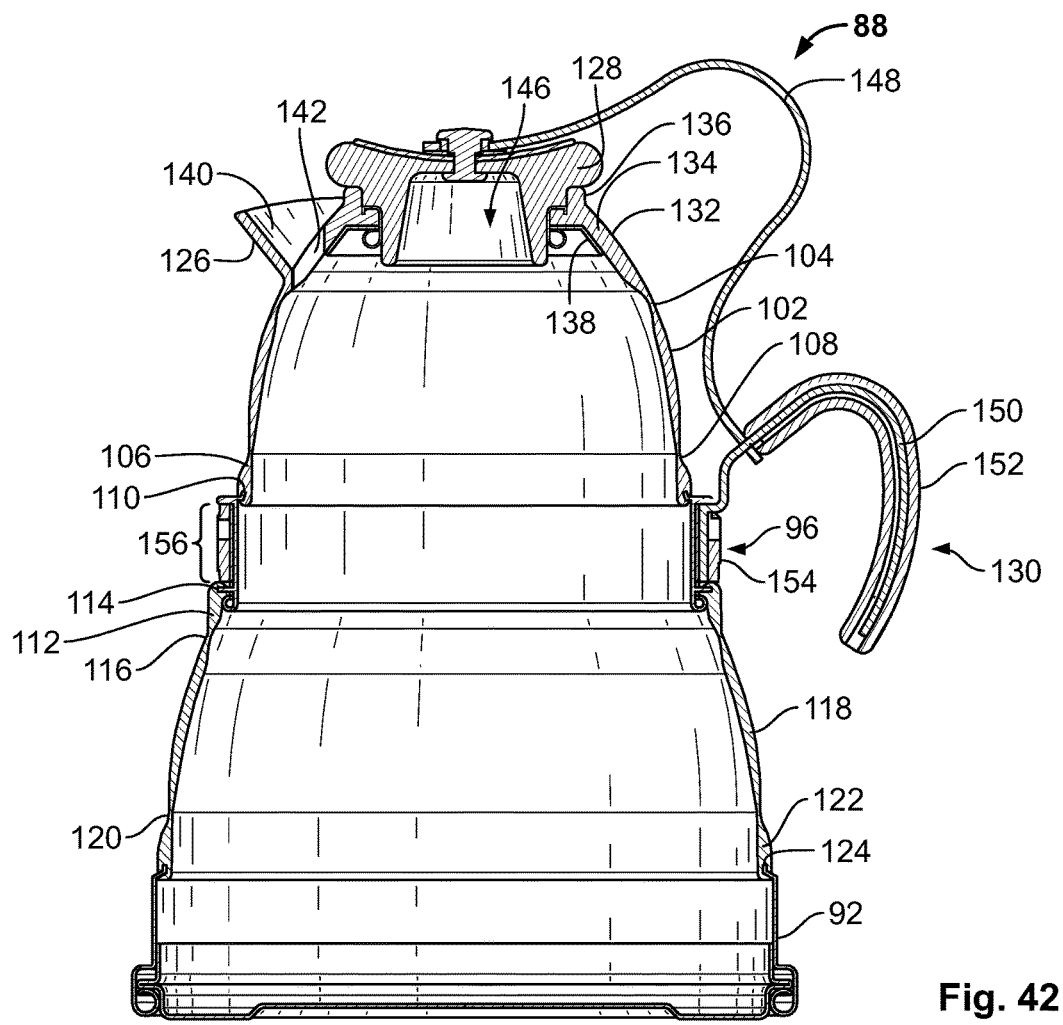
FIG. 42 is a cross-sectional side elevation view of the collapsible heatable kettle shown in FIG. 34.
Figure 43:
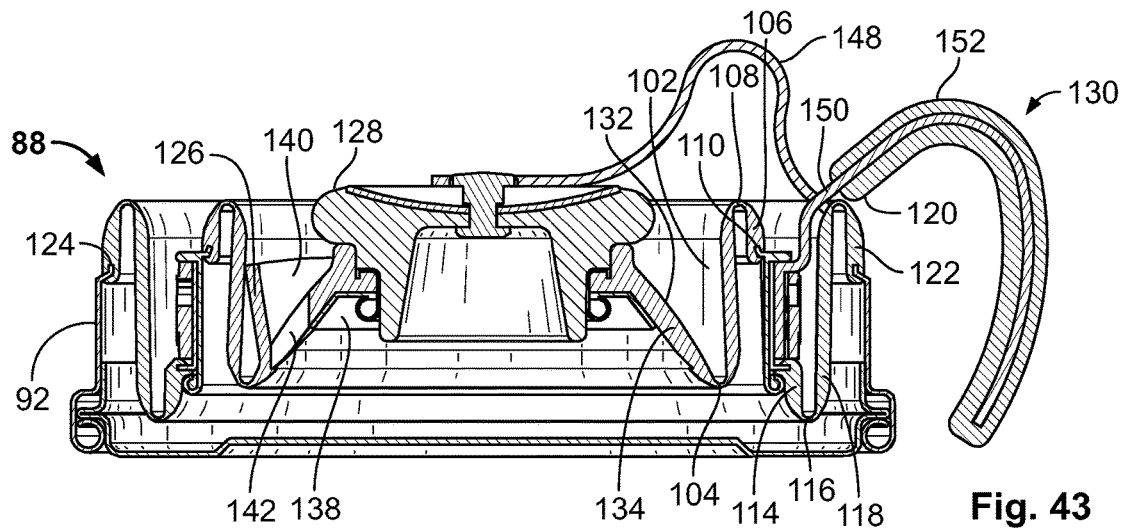
FIG. 43 is a cross-sectional side elevation view of the collapsible heatable kettle shown in FIG. 34, in a fully collapsed state.
Figure 44:
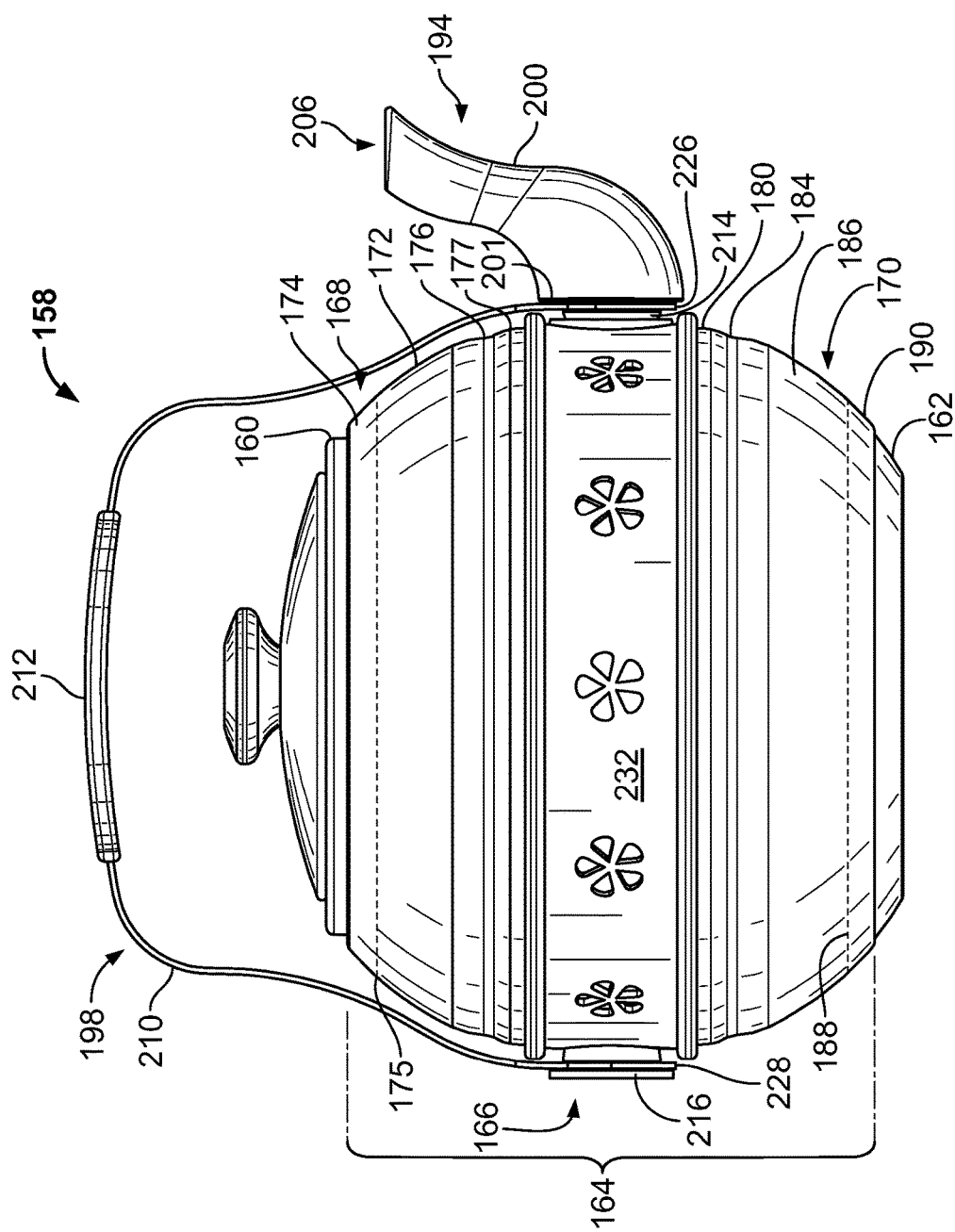
FIG. 44 is a side elevation view of a collapsible heatable kettle with a gooseneck spout according to another aspect of the invention.
Figure 45:
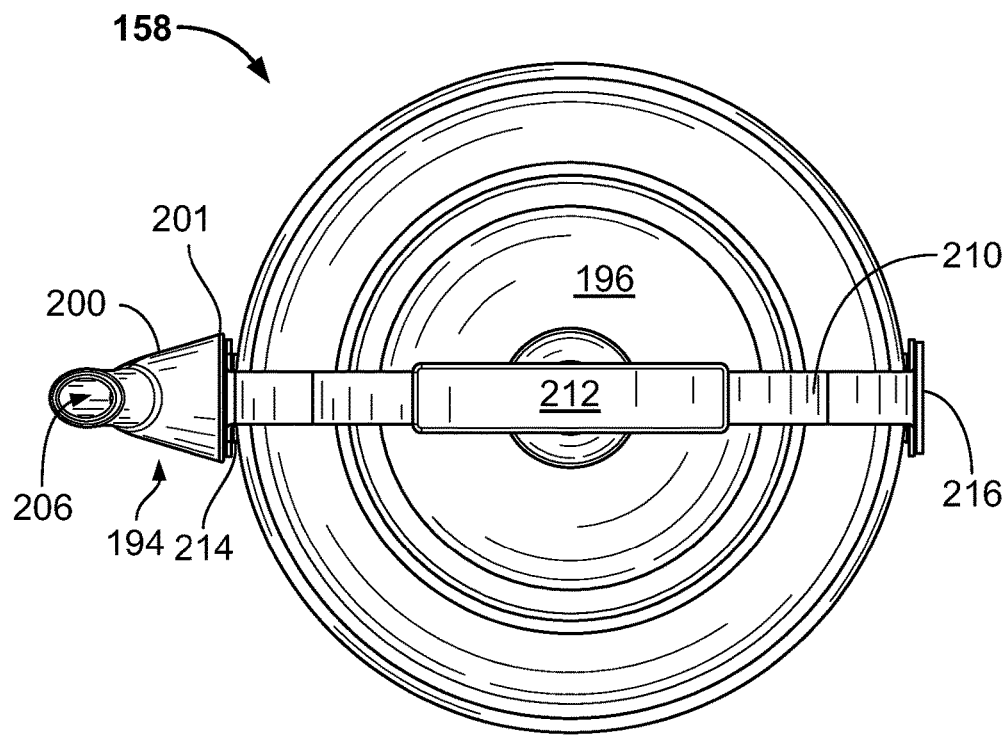
FIG. 45 is a top plan view of the collapsible heatable kettle shown in FIG. 44.
Figure 46:
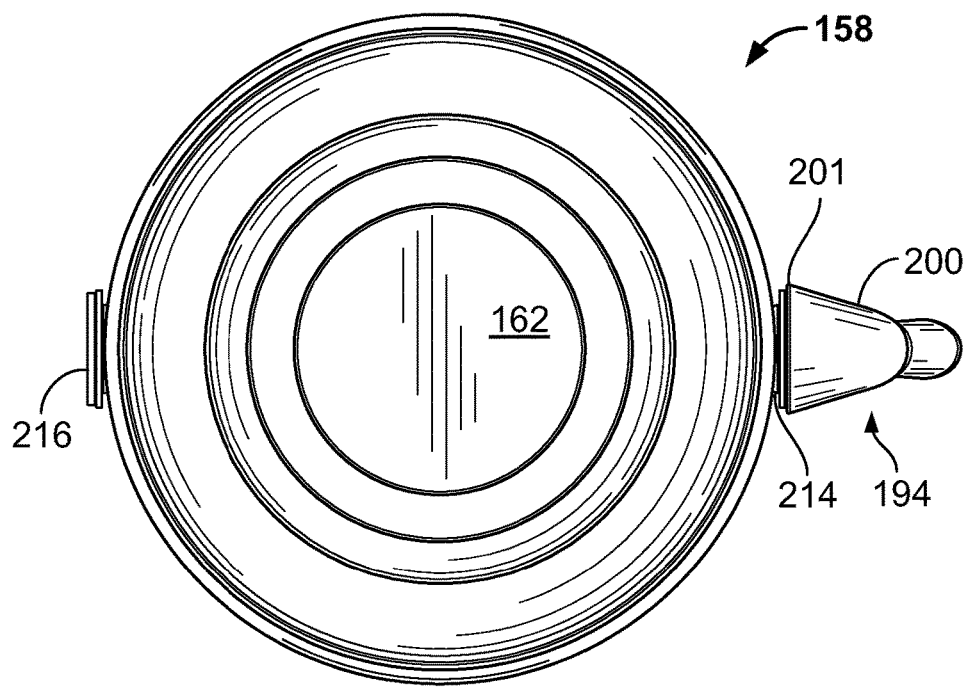
FIG. 46 is a bottom plan view of the collapsible heatable kettle shown in FIG. 44.

In its fully collapsed state, bottle 10 is not only made significantly more compact for convenient storage and carrying, but also protected from inadvertent impacts or crushing forces by the strength and stiffness/rigidity of middle tier 16 which generally surrounds fully collapsed bottle 10 on all sides. With reference to FIG. 17, it can be seen that small portions of collapsed upper inverting tier 18 and of top tier 12 protrude above the top edge of middle tier 16, and small portions of lower inverting tier 20 and bottom tier 14 protrude below the bottom edge of middle tier 16. Thus, a large, flat object pressing on the top, bottom, or both sides of fully collapsed bottle 10 could displace top tier 12 and/or bottom tier 14 somewhat, such as by respective vertical clearances $C_1$, by which cap 30 extends above thin wall section 38 of middle tier 16, and $C_2$, by which bottom section 52 of bottom tier 14 extends below thin wall section 40 of middle tier 16. However, a clearance $C_3$ between the bottom of top tier 12 and the top of bottom tier 14 in the collapsed state is also provided, to limit any impingement between top tier 12 and bottom tier 14 that may inadvertently occur as a result of storing collapsed bottle 10 in a tight vertical space. In addition, a clearance $C_4$ between living hinge 56 and living hinge 62 in the fully collapsed equilibrium state is generally desirable to avoid passive stresses in inverting tiers 18, 20 that could result in creep, fatigue, or wear, when bottle 10 is stored fully collapsed. In an alternative embodiment not shown, if it is desired for middle tier 16 to wholly prevent, rather than merely limiting, further vertical compression of collapsed top and bottom tiers 12 and 14 and inverting tiers 18, 20, a height h of the exposed portion of middle tier 16 could simply be expanded, without changing the locations of the overmold joints, to extend up to or slightly above the level of the top of cap 30 and down to or slightly below the level of living hinge 60 in the fully collapsed state. In still another alternative embodiment not shown, the upper and lower inverting tiers could be made from a continuous band of flexible material overlapping the entire interior surface of the stiff or rigid middle tier (the overlapping portion perhaps having a reduced wall thickness), thus eliminating the need for the stiff or rigid middle tier to be imperforate. This could reduce the raw material cost of the middle tier, while at the same time thermally insulating the middle tier from hot liquid inside the bottle and eliminating the reliance on overmolded joints to seal the interior volume.

Figure 9:
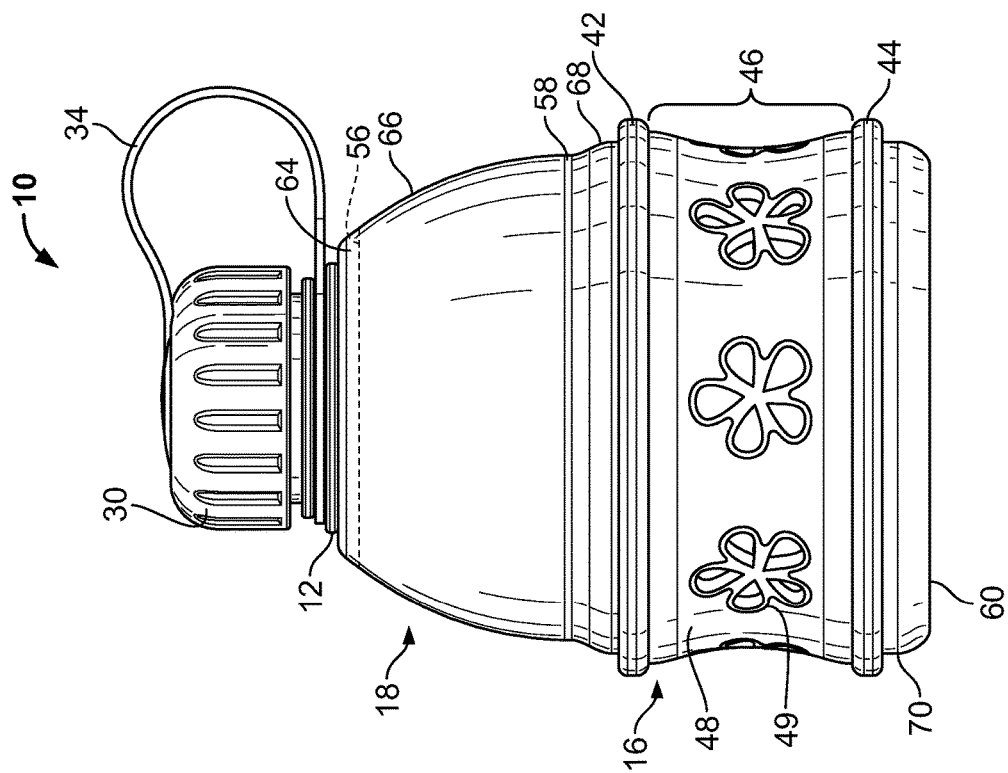
FIG. 9 is a side elevation view of the collapsible heatable bottle depicted in FIG. 1, shown in a collapsed-bottom-tier state.
Figure 11:
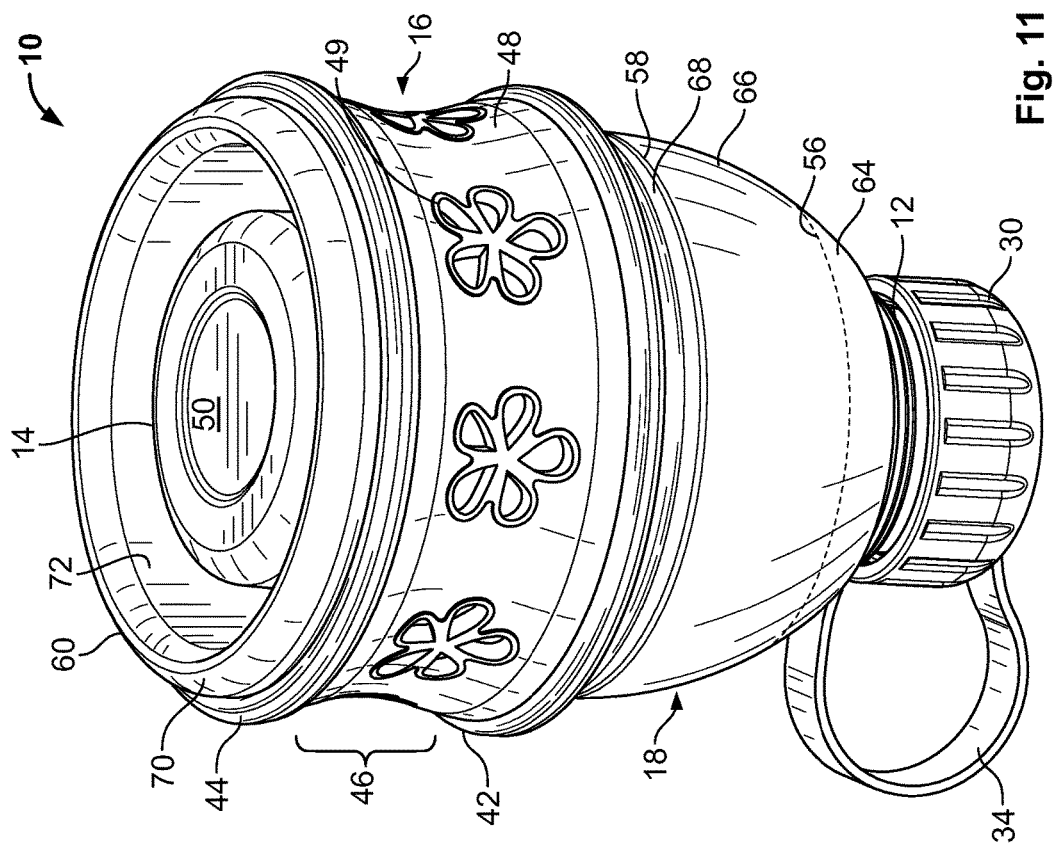
FIG. 11 is a bottom perspective view of the collapsible heatable bottle depicted in FIG. 1, shown in a collapsed-bottom-tier state.
Figure 14:
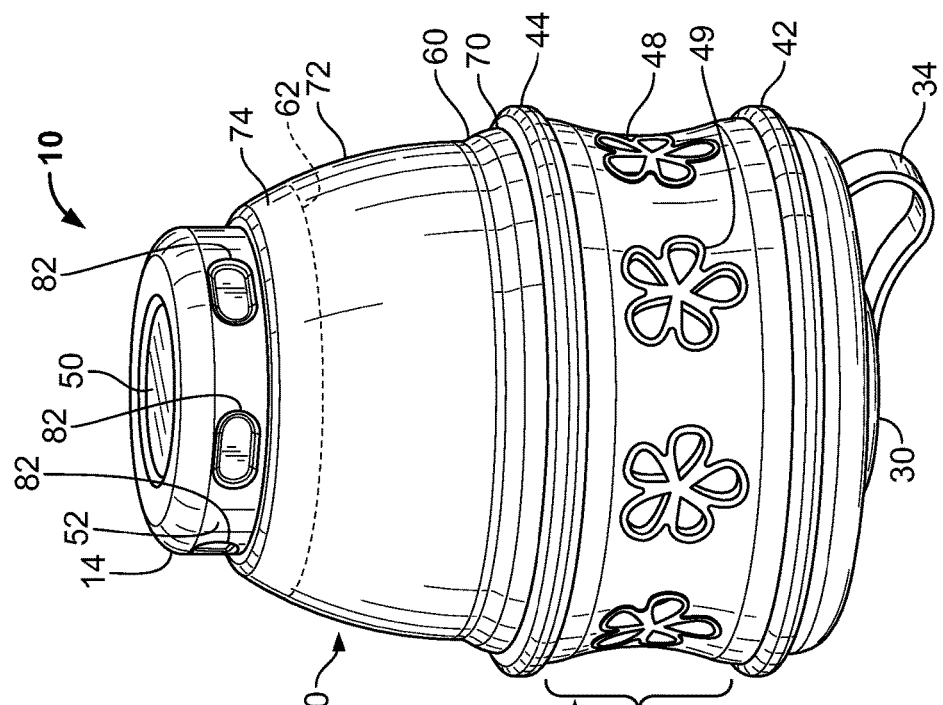
FIG. 14 is a top perspective view of the collapsible heatable bottle depicted in FIG. 1, shown in a collapsed-top-tier state.
Figure 15:
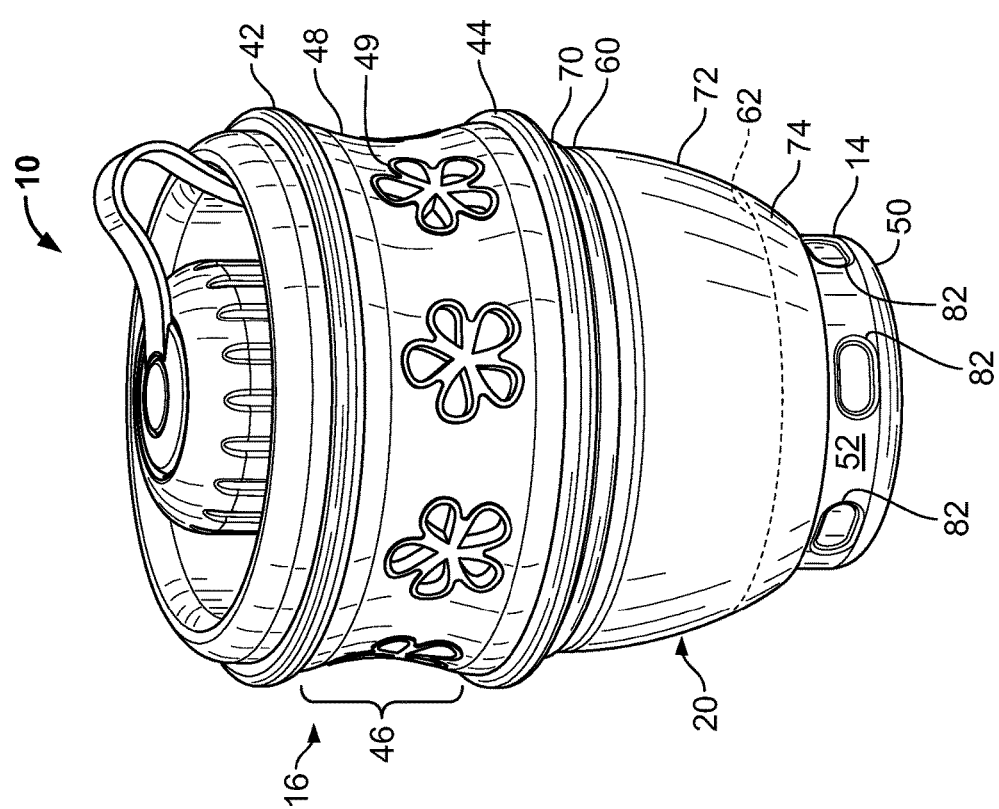
FIG. 15 is a bottom perspective view of the collapsible heatable bottle depicted in FIG. 1, shown in a collapsed-top-tier state.

In a collapsed-lower-tier state depicted in FIGS. 9-11, bottle 10 conveniently serves as a tip resistant drinking bottle, which may be confidently placed on an office desk, for example, with minimized risk of accidental spilling, due to its broad base providing a low center of gravity. In the illustrated example, a further surprising benefit is provided by a portion of lower inverting tier 20, comprising living hinge 60, part of connecting band 70 and part of invertible band 72, which extends below the bottom of middle tier 16, providing bottle 10 traction with a supporting surface. Thus, in its collapsed-lower-tier state, bottle 10 is stabilized against both tipping and sliding.

In a collapsed-upper-tier state shown in FIGS. 12-15, bottle 10 may conveniently be placed in a small-diameter vehicle cup-holder recess, while at the same time its profile is lowered. Advantageously, this may reduce the invasion of space near a floor/lower mounted gear shift lever, for example, to avoid obstructing a driver's hand and arm movements. Although a recessed position of bottle rim 26 could make drinking more difficult, a straw could be employed in this configuration.

Collapsible Flame-Heatable Bottle

Turning to FIGS. 18-33, an alternative embodiment is depicted in which bottle 10 is adapted for flame heating by attaching a flame guard attachment 78. Flame guard attachment 78 includes spring tabs 80 configured to mate with recesses 82 formed in wall section 52 of bottom tier 14, for sliding attachment and removal of a sleeve portion 81 of flame guard attachment 78 from bottom tier 14. Recesses 82 are shown wherever wall section 52 is depicted in FIGS. 1-17; however, these recesses are optional, as a flame guard attachment 78 is not needed for electric range, hot plate, or induction heating. Flame guard attachment 78 includes a peripheral flange 84 that generally tapers downwardly and radially outwardly, terminating at a rounded base rim 86. The breadth and downward concavity of guard attachment 78 serve to inhibit a flame from curling around bottom tier 14 to directly contact and possibly melt the typically polymeric flexible material of the inverting tiers of bottle 10, especially that of lower inverting tier 20. A rippled profile shape of flange 84 promotes even distribution of stresses from cycles of thermal expansion and contraction of its material, thus inhibiting warping, which could adversely affect not only the appearance of guard attachment 78, but also potentially its function, allowing flames to escape around rim 86 or through a gap produced between guard attachment 78 and wall section 52 of bottom tier 14.

Collapsible V-Spout Kettle

With reference to FIGS. 34-43, a collapsible V-spout kettle 88 will now be described. Kettle 88 includes a non-inverting top tier 90, a non-inverting bottom tier 92, and a collapsible wall section 94 comprising a non-inverting middle tier 96 and upper and lower inverting tiers 98,100, respectively connecting middle tier 96 to top tier 90 and to bottom tier 92. Upper inverting tier 98 includes an inverting band 102 connected to top tier 90 by a superior living hinge 104, and a non-inverting connecting band 106 connected to inverting band 102 by an inferior living hinge 108. Connecting band 106 is overmolded onto a superior thin wall section 110 of middle tier 96. Lower inverting tier 100 includes a non-inverting superior connecting band 112 overmolded onto an inferior thin wall section 114 of middle tier 96, a superior living hinge 116 between connecting band 112 and an inverting band 118, an inferior living hinge 120 between inverting band 118 and a non-inverting inferior connecting band 122, which in turn is overmolded onto a thin wall section 124 of bottom tier 92. Bottom tier 92 is typically composed of metal such as stainless steel, to facilitate heating over open flame, on a gas or electric range, on a hotplate, or on an induction cooktop. A fully expanded state of kettle 88 is illustrated in FIGS. 34-36, 41, and 42, and a fully collapsed state is shown in FIGS. 37-40 and 43. Partially collapsed states, though not shown in the drawings, are also possible, analogously to the corresponding collapsed-upper-tier and collapsed-lower-tier states of bottle 10 described above.

Features that distinguish kettle 88 as a kettle include a spout 126, a lid 128, a handle 130, as well as bottom tier 92 having the largest circumference of its tiers, to provide a large contact area for heat transfer into water or a beverage contained in kettle 88, as well as to distribute the bulk of the interior volume of kettle 88 toward its vertical bottom half, and thus toward a heat source on which it is placed. The construction of kettle 88 also differs notably from that of bottle 10 in that a shell 132 of top tier 90 is a continuous extension of upper inverting tier 98, formed of the same flexible material, shell 132 including an upper wall section 134 extending between upper inverting tier 98 and a kettle rim 136, as well as pour spout 126. Structural integrity (stiffness or rigidity) of top tier 90 is provided by an annular inner frame 138 over which wall section 134 is molded. Spout 126 is generally V- or U-shaped when viewed from above, as seen in FIG. 34, or when viewed along an axis defined by a pouring direction P shown in FIG. 35. Spout 126 includes a pour channel 140 (shown in FIGS. 36, 42, and 43) in fluid communication with a pour opening 142 formed in wall section 134. In the illustrated embodiment, an upper extent of pour opening 142 terminates at inner frame 138. This permits inner frame 138 to be a complete, uninterrupted annulus, promoting the structural integrity of top tier 90. However, in alternative embodiments, a top tier of a collapsible V-spout kettle may feature a gap in its upper rim at the location of a spout. As another optional feature, ribs 144 extend across pour opening 142, serving as a course filter to prevent large objects inside kettle 88, such as a tea bag or tea ball, from exiting through pour opening 142, as well as helping to prevent large foreign objects from entering kettle 88 through pour opening 142.

Lid 128 is preferably formed of a resilient material, sized for a snug or interference fit within a kettle opening 146 defined by an inner perimeter of inner frame 138, so as to seal opening 146. Lid 128 may advantageously be permanently connected to another part of kettle 88, such as handle 130, by a tether 148.

Handle 130 is integrally attached to middle tier 96 opposite spout 126, to facilitate stable pouring from kettle 88. Handle 130 is typically comprised of a rigid (typically stainless steel) core band 150 that attaches directly to middle tier 96 and a grip 152 which may be a sleeve or coating of hard plastic, foam, a suitable elastomer, or other comfortable gripping material, covering a portion of the length of core band 150. An elastomeric band 154 may be seated in a channel 156 defined by middle tier 96, promoting thermal insulation and possibly preventing burns to a user, similarly to band 48 of bottle 10.

Collapsible Gooseneck Spout Kettle

With reference to FIGS. 44-54, a collapsible gooseneck-spout kettle 158 according to another embodiment of the invention will now be described. Kettle 158 includes a non-inverting top tier 160, a non-inverting bottom tier 162, and a collapsible wall section 164 comprising a non-inverting middle tier 166 and upper and lower inverting tiers 168,170, respectively connecting middle tier 166 to top tier 160 and to bottom tier 162. Upper inverting tier 168 includes an inverting band 172 connected to a superior non-inverting connecting band 174 by a superior living hinge 175, and an inferior non-inverting connecting band 177 connected to inverting band 172 by an inferior living hinge 176. Superior connecting band 174 is overmolded onto a thin wall section 179 of upper tier 160, and inferior connecting band 177 is overmolded onto a superior thin wall section 178 of middle tier 166. Lower inverting tier 170 includes a non-inverting superior connecting band 180 overmolded onto an inferior thin wall section 182 of middle tier 166, a superior living hinge 184 between connecting band 180 and an inverting band 186, an inferior living hinge 188 between inverting band 186 and a non-inverting inferior connecting band 190, which in turn is overmolded onto a thin wall section 192 of bottom tier 162. Bottom tier 162 is typically composed of metal such as stainless steel, to facilitate heating over open flame, on a gas or electric range, on a hotplate, or on an induction cooktop.

Figure 47:
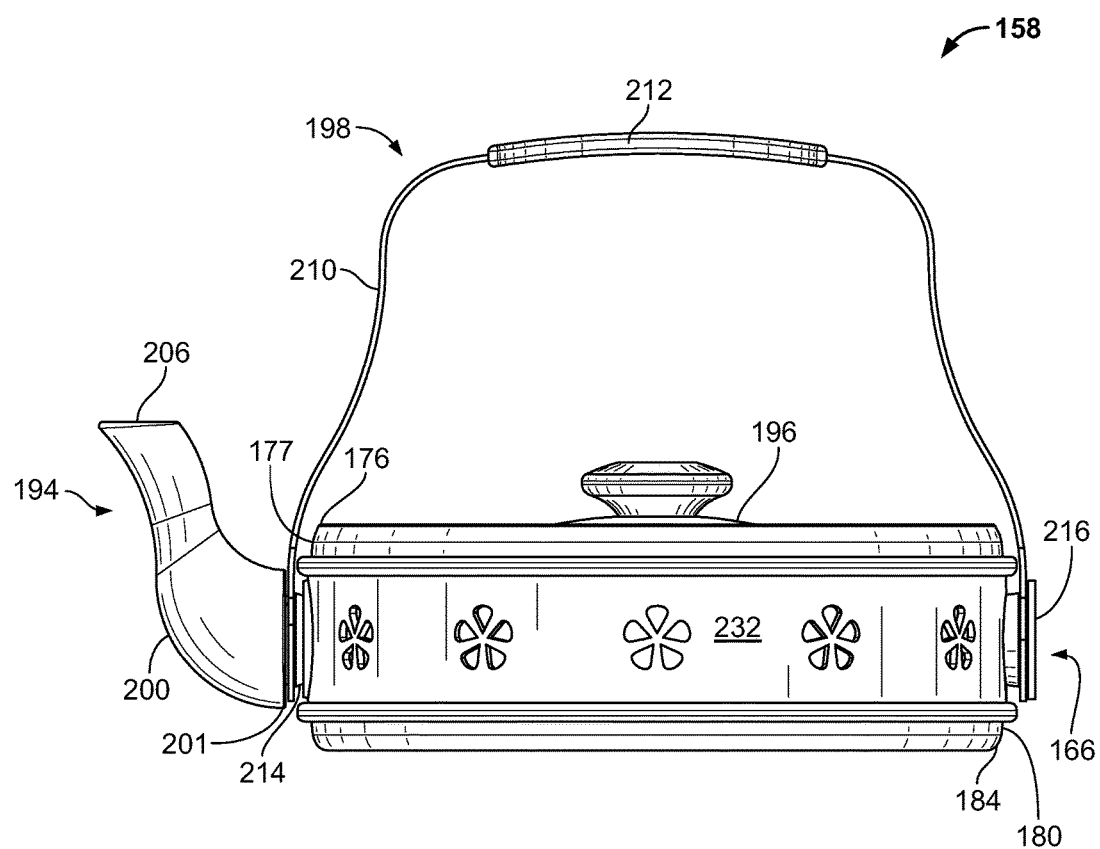
FIG. 47 is a side elevation view of the collapsible heatable kettle shown in FIG. 44, in a fully collapsed state.
Figure 48:
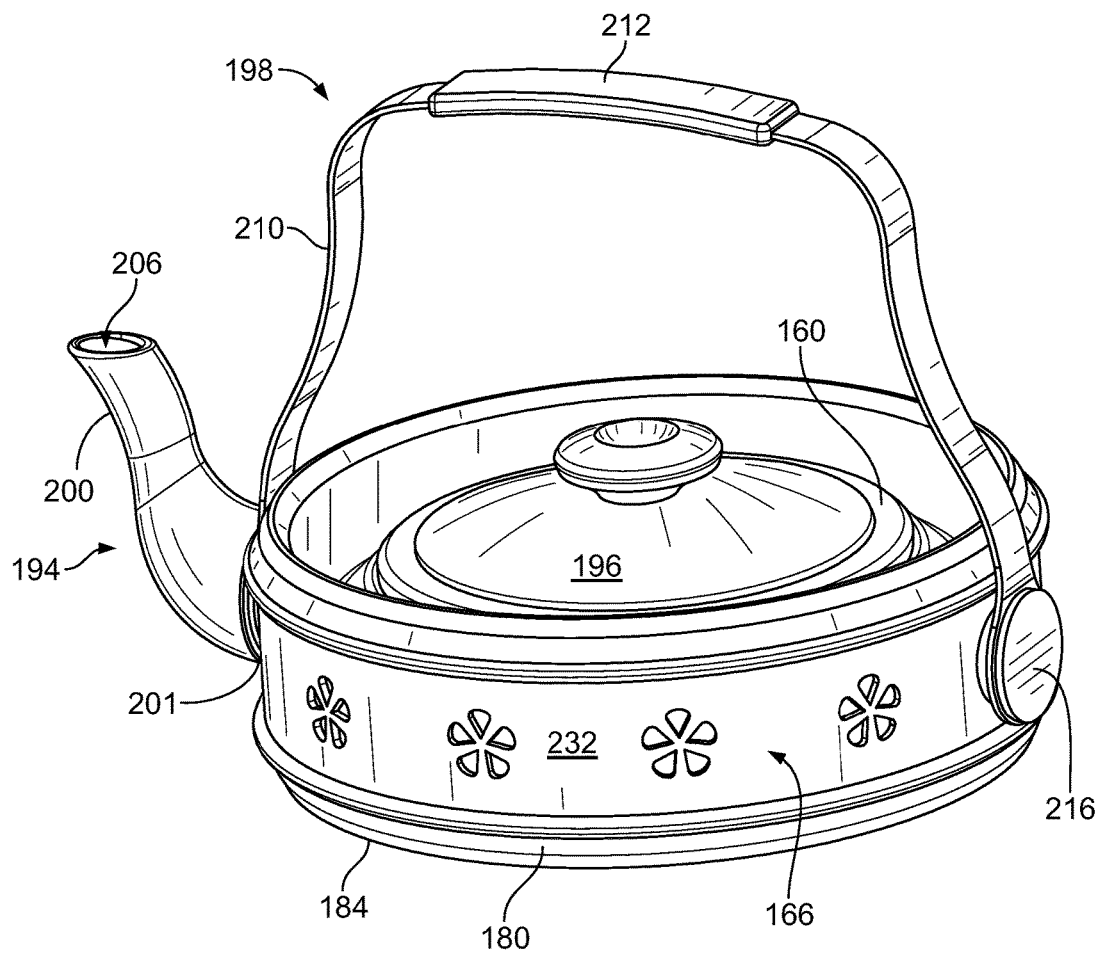
FIG. 48 is a top perspective view of the collapsible heatable kettle shown in FIG. 44, in a fully collapsed state.
Figure 49:
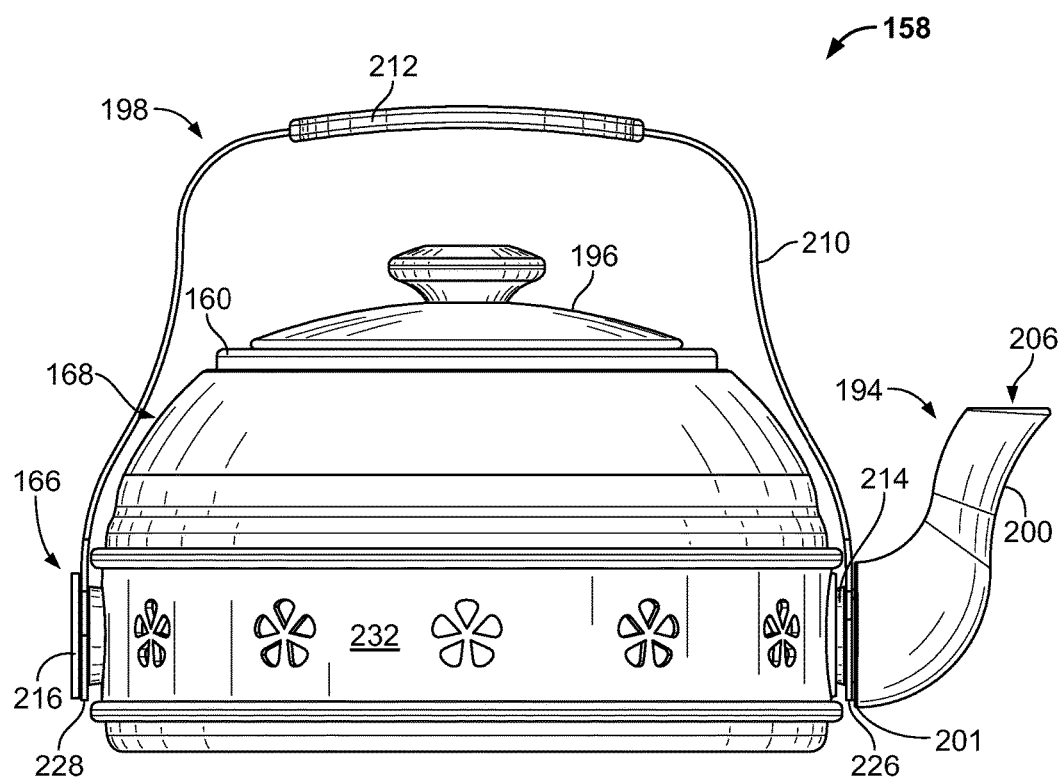
FIG. 49 is a side elevation view of the collapsible heatable kettle shown in FIG. 44, in a collapsed-bottom-tier state.
Figure 50:
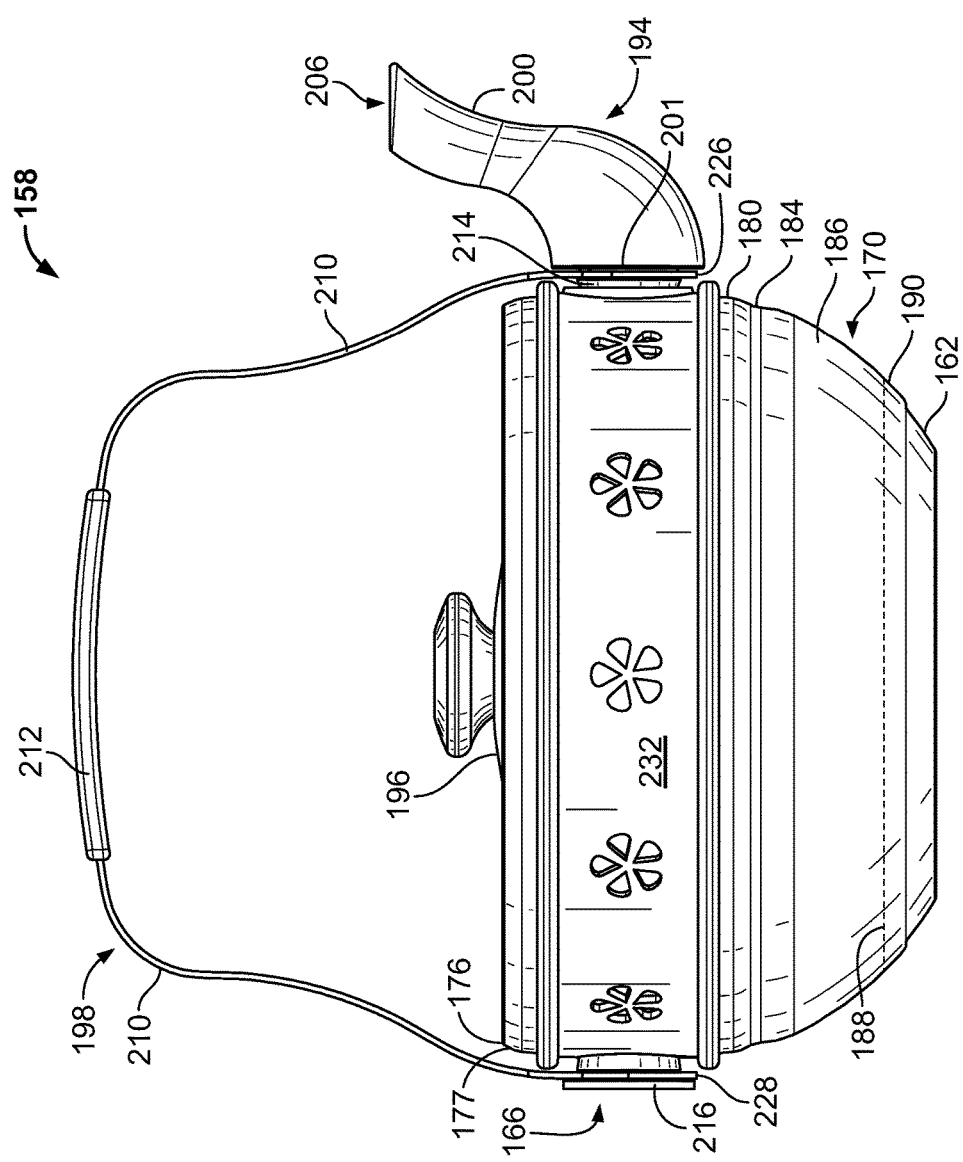
FIG. 50 is a side elevation view of the collapsible heatable kettle shown in FIG. 44, in a collapsed-top-tier state.
Figure 51:
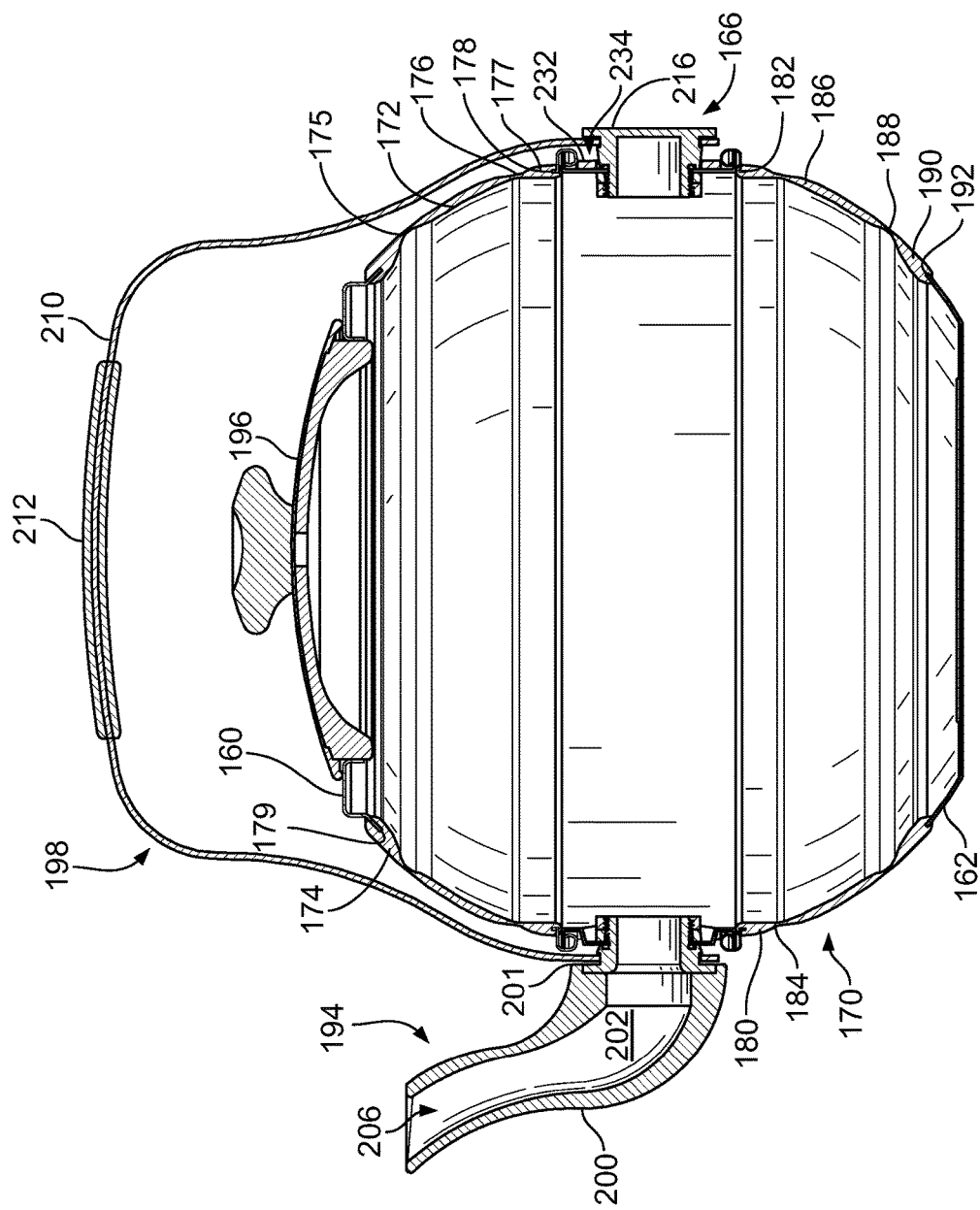
FIG. 51 is a cross-sectional side elevation view of the collapsible heatable kettle shown in FIG. 44.
Figure 52:
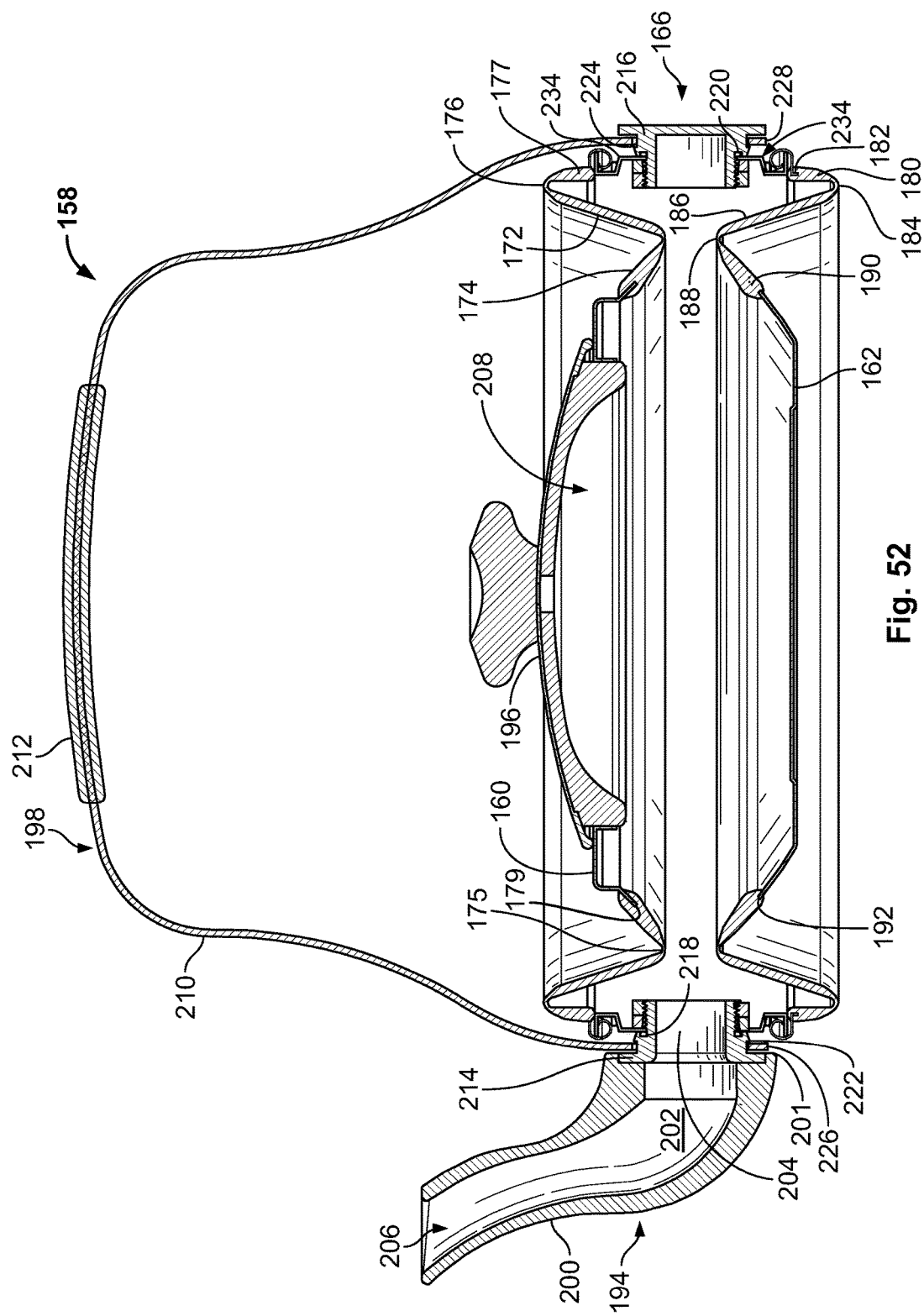
FIG. 52 is a cross-sectional side elevation view of the collapsible heatable kettle shown in FIG. 44, in a fully collapsed state.

A fully expanded state of kettle 158 is illustrated in FIGS. 44-46 and 51, and a fully collapsed state is shown in FIGS. 47, 48, and 52. Partially collapsed states are illustrated in FIGS. 49 (collapsed-lower-tier) and 50 (collapsed-upper-tier) respectively. In contrast to kettle 88 shown in FIGS. 34-43, kettle 158 has a generally round profile, its top and bottom tiers 160,162 having smaller cross sections than its middle tier 166 to permit them both to insert at least partially into middle tier 166 when collapsed.

Features that distinguish kettle 158 as a kettle include a gooseneck spout 194, a lid 196, and a handle 198. Spout 194 has an elongate stem 200 that attaches at a base 201 to middle tier 166 and extends radially outwardly and upwardly therefrom. Stem 200 defines an interior pour channel 202 in fluid communication with the interior of kettle 158 through an opening 204 in middle tier 166. Pour channel 202 terminates at a pour opening 206 at a distal end of spout 194, pour opening 206 at or near the vertical level of a top opening 208 defined by top tier 160 and covered by lid 196, to permit kettle 158 to be filled with liquid approximately to the level of top tier 160 without overflowing through pour opening 206. The elongate gooseneck shape and attachment of spout 194 to middle tier 166 is permitted by the rounded profile shape of kettle, in which middle tier 166 receives both top and bottom tiers 160, 162, rather than being received by either of them; thus, spout 194 does not obstruct the collapse of kettle 158. Optionally, though not shown in the drawings, a suitable cap or stopper may be provided to selectively close off pour opening 206, with or without a tether, hinge, or other means of permanent attachment to kettle 158. As another optional feature not shown, spout 194 or a cover for spout 194 may incorporate a whistle configured to produce a whistle sound when steam rapidly escapes therethrough.

In turn, the shape and attachment location of spout 194 permits handle 198 to extend over the body of kettle 158 and pivotally support kettle 158 at two locations on middle tier 166, one near spout stem base 201 and one generally opposite. Handle 198 may be formed of a stainless steel band 210, for example, pivotally connecting at its opposite ends to middle tier 166, and including a grip 212 comprised of a hard plastic, foam, or elastomer material coated onto or otherwise covering a middle portion of band 210 directly above top opening 208.

Figure 53:
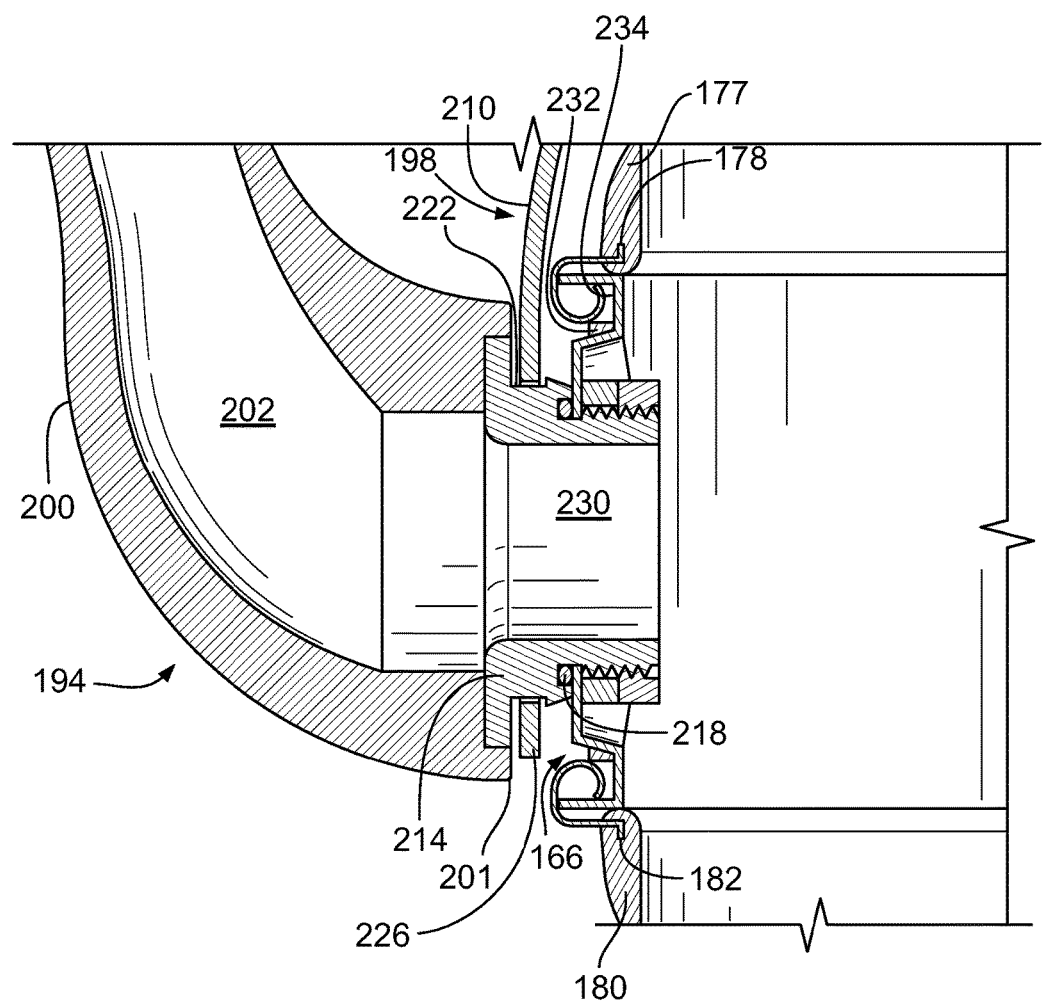
FIG. 53 is a partial cross-sectional side elevation view of the collapsible heatable kettle shown in FIG. 44, depicting a spout attachment and handle mount.
Figure 54:
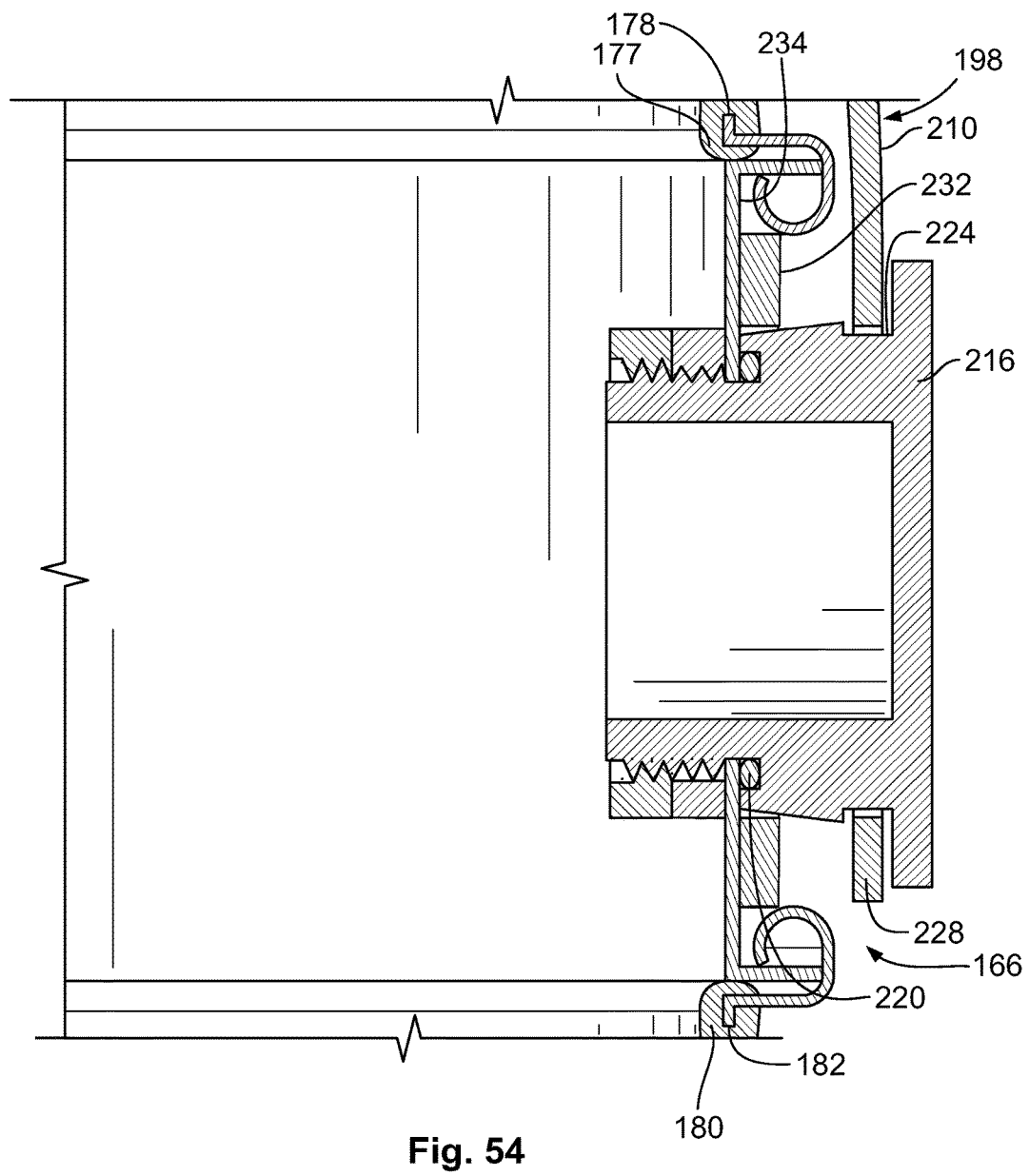
FIG. 54 is a partial cross-sectional side elevation view of the collapsible heatable kettle shown in FIG. 44, depicting another handle mount.

Turning to FIGS. 53 and 54, fragmentary cross sectional views are provided to illustrate in detail the connection of handle 198 and spout 194 to middle tier 166. In particular, handle mounts 214 and 216 are illustrated, which screw into opposite sides of middle tier 166 and are sealed by respective O-rings 218, 220. Handle mounts include respective annular channels 222, 224 for receiving annular collars 226, 228 at corresponding ends of handle band 210, as best seen in FIGS. 53 and 54. Handle mount 214 includes a fluid channel 230 extending fully therethrough in communication with spout 194 and the interior fluid volume of kettle 158. Spout 194 may be formed of a silicone or thermoplastic elastomer, for example, and attached to handle mount 214 by overmolding. Handle mount 216, on the other hand, is closed at its outward end so as to seal and close off the corresponding opening in middle tier 166.

As noted for the previously described embodiments, an elastomeric band 232 may be seated in a channel 234 defined by middle tier 166, promoting thermal insulation and reducing the risk of burns to a user. Appropriately sized openings in band 232 may be formed to permit handle mounts 214, 216 to be screwed into middle tier 166.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A collapsible liquid container comprising
a generally annular, stiff top tier;
a bottom tier including an imperforate bottom surface, wherein the bottom tier is composed of a thermally conductive metallic material, which is flame resistant metallic and is configured to conduct heat from a flame to a liquid in the container or which is ferromagnetic and electrically resistive and the bottom tier is configured for induction heating; and
a collapsible wall section connecting the top tier to the bottom tier, the collapsible wall section including at least three stacked, generally annular tiers;
the collapsible wall section, top tier, and bottom tier collectively defining a watertight container body having a container volume in fluid communication with a fluid opening;
at least one of the collapsible wall section tiers being a stiff middle tier; and
at least two of the collapsible wall section tiers being flexible and configured to fold between relatively expanded and relatively collapsed positions, including at least one flexible tier disposed above the middle tier and at least one flexible tier disposed below the middle tier, the flexible tiers being composed of a flexible material and the middle tier being composed of a stiff material that is stiffer than the flexible material;
wherein the size of the container volume can be increased by folding at least one of the flexible tiers from a relatively collapsed to a relatively expanded position and can be decreased by folding at least one of the flexible tiers from a relatively expanded to a relatively collapsed position, the top tier being at least partially inserted into the middle tier when collapsed, and the bottom tier being at least partially inserted into the middle tier when collapsed, the top and bottom tiers being narrower than the middle tier.

2. The liquid container of claim 1, the fluid opening being disposed in the top tier, the fluid opening configured to be opened and closed to selectively allow and restrict the flow of fluid into and out of the container body through the fluid opening.

3. The liquid container of claim 2, further comprising a lid removably covering the fluid opening.

4. The liquid container of claim 2, further comprising a valve connected to the top tier to open and close the fluid opening.

5. The liquid container of claim 3, further comprising a lid retention member permanently connected to the lid and to the container body to permit the lid to be removed from the fluid opening while remaining connected to the container body.

6. A collapsible liquid container, comprising
a generally annular top tier that is stiff;
a stiff bottom tier composed of a thermally conductive, flame resistant metallic material configured to conduct heat from a flame to a liquid in the container;
a collapsible wall section connected to the top tier and the bottom tier, the collapsible wall section comprising at least a first stiff middle tier, a first flexible tier disposed between the middle tier and the top tier, and a second flexible tier disposed between the middle tier and the bottom tier, the flexible tiers being composed of a flexible material and the top, bottom, and middle tiers being composed of a stiff material that is stiffer than the flexible material, each flexible tier being adapted to fold between at least one relatively expanded position and at least one relatively collapsed position;
the first flexible tier joined to the middle tier and to the top tier, to provide watertight connections between the first flexible tier and the respective middle and top tiers, and the second flexible tier joined to the middle tier and the bottom tier, to provide watertight connections between the second flexible tier and the respective middle and bottom tiers, so that the collapsible wall section, top tier, and bottom tier collectively define a watertight container body; and
a fluid opening comprised in the container body in fluid communication with the container volume.

7. The liquid container of claim 6, said bottom tier further comprising a downwardly extending peripheral flange configured to shield the flexible tiers from direct exposure to flame when said bottom tier is heated over a flame.

8. The liquid container of claim 7, said peripheral flange being comprised in a flame guard attachment member removably connected to said bottom tier.

9. The liquid container of claim 6, wherein said fluid opening is comprised in the top tier.

10. The liquid container of claim 9, further comprising a lid configured to removably cover the fluid opening.

11. The liquid container of claim 10, further comprising a lid retention member connected to the lid and to the container body to permit the lid to be removed from the fluid opening while remaining connected to the container body.

12. The liquid container of claim 6, said top tier and said bottom tier being at least partially inserted into said middle tier when collapsed.

13. A collapsible liquid container comprising
a generally annular, stiff top tier;
a bottom tier including an imperforate bottom surface; and
a collapsible wall section connecting the top tier to the bottom tier, the collapsible wall section including at least three stacked, generally annular tiers;
the collapsible wall section, top tier, and bottom tier collectively defining a watertight container body having a container volume in fluid communication with a fluid opening;
at least one of the collapsible wall section tiers being a stiff middle tier; and
at least two of the collapsible wall section tiers being flexible and configured to fold between relatively expanded and relatively collapsed positions, including at least one flexible tier disposed above the middle tier and at least one flexible tier disposed below the middle tier, the flexible tiers being composed of a flexible material and the middle tier being composed of a stiff material that is stiffer than the flexible material;
wherein the size of the container volume can be increased by folding at least one of the flexible tiers from a relatively collapsed to a relatively expanded position and can be decreased by folding at least one of the flexible tiers from a relatively expanded to a relatively collapsed position, the top tier being at least partially inserted into the middle tier when collapsed, and the bottom tier being at least partially inserted into the middle tier when collapsed,
wherein the bottom tier is composed of a thermally conductive metallic material which is ferromagnetic and electrically resistive and the bottom tier is configured for induction heating.

14. The liquid container of claim 1 wherein the middle tier is rigid and the stiff material is different material from the flexible material.

15. The liquid container of claim 6 wherein the middle tier is rigid and the stiff material is different from the flexible material.

16. The liquid container of claim 1 wherein the middle tier comprises a steel annulus having an exterior at least partially covered by a thermally insulating material.

17. The liquid container of claim 6 wherein the middle tier comprises a steel annulus having an exterior at least partially covered by a thermally insulating material.

18. The liquid container of claim 3 wherein the lid does not extend to the collapsible wall section.

19. The liquid container of claim 6 further comprising a pour spout having a generally V-shaped wall structure protruding radially outwardly from the top tier to define a spout channel.

20. The liquid container of claim 1 further comprising a pour spout having an elongate spout tube.

21. The liquid container of claim 20, said spout tube being removably connected to the container body.

22. The liquid container of claim 20, said elongate spout tube being in fluid communication to an opening in said middle tier at a spout tube inlet end and having a spout tube pour opening at a spout tube outlet end opposite the inlet end.

23. The liquid container of claim 13 further comprising a pour spout having an elongate spout tube.

24. The liquid container of claim 23, said spout tube being removably connected to the container body.

25. The liquid container of claim 23, said elongate spout tube being in fluid communication to an opening in said middle tier at a spout tube inlet end and having a spout tube pour opening at a spout tube outlet end opposite the inlet end.

* * * * *